US008832076B2

(12) United States Patent
Gutlapalli et al.

(10) Patent No.: US 8,832,076 B2
(45) Date of Patent: *Sep. 9, 2014

(54) SEARCH SERVER ARCHITECTURE USING A SEARCH ENGINE ADAPTER

(75) Inventors: Hari Krishna Gutlapalli, Hercules, CA (US); Shirish Kasturchand Kothari, Freemont, CA (US); Suhas Rohit Mehta, San Jose, CA (US); Wai Pak, Hercules, CA (US)

(73) Assignee: Oracle International Corporation, Redwood Shores, CA (US)

( * ) Notice: Subject to any disclaimer, the term of this patent is extended or adjusted under 35 U.S.C. 154(b) by 724 days.

This patent is subject to a terminal disclaimer.

(21) Appl. No.: 12/254,473

(22) Filed: Oct. 20, 2008

(65) Prior Publication Data

US 2009/0157629 A1    Jun. 18, 2009

Related U.S. Application Data

(60) Provisional application No. 60/981,367, filed on Oct. 19, 2007.

(51) Int. Cl.
*G06F 17/30* (2006.01)

(52) U.S. Cl.
CPC .... *G06F 17/30011* (2013.01); *G06F 17/30943* (2013.01); *G06F 17/30864* (2013.01)
USPC ........................................................ 707/715

(58) Field of Classification Search
CPC ................................................ G06F 17/30864
USPC .................................. 707/707, 711, 713, 715
See application file for complete search history.

(56) References Cited

U.S. PATENT DOCUMENTS

| | | | |
|---|---|---|---|
| 4,754,321 A | 6/1988 | Srivastava | 348/652 |
| 5,692,176 A * | 11/1997 | Holt et al. | 1/1 |
| 5,787,428 A | 7/1998 | Hart | 1/1 |
| 6,182,142 B1 * | 1/2001 | Win et al. | 709/229 |
| 6,327,590 B1 | 12/2001 | Chidlovskii et al. | 707/5 |
| 6,421,675 B1 | 7/2002 | Ryan et al. | 1/1 |
| 6,640,219 B2 | 10/2003 | Fernandes et al. | 707/3 |
| 6,640,249 B1 * | 10/2003 | Bowman-Amuah | 709/228 |
| 6,704,726 B1 * | 3/2004 | Amouroux | 1/1 |
| 7,020,658 B1 | 3/2006 | Hill | 1/1 |
| 7,039,625 B2 * | 5/2006 | Kim et al. | 707/706 |
| 7,133,863 B2 | 11/2006 | Teng et al. | 707/8 |
| 7,143,085 B2 * | 11/2006 | Brown et al. | 1/1 |
| 7,254,571 B2 * | 8/2007 | Brown et al. | 1/1 |
| 7,725,447 B2 * | 5/2010 | Subramaniam et al. | 707/705 |
| 7,953,984 B1 * | 5/2011 | Chung et al. | 713/188 |
| 2002/0057297 A1 | 5/2002 | Grimes et al. | 345/810 |
| 2002/0087526 A1 | 7/2002 | Rao | 707/3 |
| 2002/0107842 A1 * | 8/2002 | Biebesheimer et al. | 707/3 |
| 2002/0116402 A1 | 8/2002 | Luke | 707/200 |
| 2003/0050959 A1 | 3/2003 | Faybishenko et al. | 709/202 |
| 2003/0126136 A1 * | 7/2003 | Omoigui | 707/10 |

(Continued)

*Primary Examiner* — Rehana Perveen
*Assistant Examiner* — Mark E Hershley
(74) *Attorney, Agent, or Firm* — Campbell Stephenson LLP

(57) ABSTRACT

A search system architecture is disclosed. The search system architecture includes a search server, which in turn includes a search services module and a search engine adapter. The search services module and the search engine adapter are communicatively coupled to one another. The search services module is configured to communicate with a user interface. The search engine adapter is configured to communicate with a search engine.

22 Claims, 16 Drawing Sheets

(56) References Cited

U.S. PATENT DOCUMENTS

| | | | |
|---|---|---|---|
| 2003/0193994 A1* | 10/2003 | Stickler | 375/150 |
| 2003/0236859 A1* | 12/2003 | Vaschillo et al. | 709/218 |
| 2004/0015485 A1* | 1/2004 | Salerno et al. | 707/3 |
| 2004/0030682 A1* | 2/2004 | Porter et al. | 707/3 |
| 2004/0205079 A1 | 10/2004 | Azzam | 707/100 |
| 2004/0215643 A1 | 10/2004 | Brechner et al. | 707/100 |
| 2005/0086204 A1 | 4/2005 | Coiera et al. | 707/3 |
| 2005/0165754 A1* | 7/2005 | Valliappan et al. | 707/3 |
| 2005/0165766 A1 | 7/2005 | Szabo | 707/3 |
| 2006/0085215 A1 | 4/2006 | Weigt et al. | 705/1 |
| 2006/0248050 A1* | 11/2006 | Brooks et al. | 707/3 |
| 2006/0253476 A1 | 11/2006 | Roth et al. | 707/100 |
| 2007/0058596 A1* | 3/2007 | Frid-Nielsen et al. | 370/338 |
| 2007/0060114 A1* | 3/2007 | Ramer et al. | 455/418 |
| 2007/0081550 A1* | 4/2007 | Moore | 370/462 |
| 2007/0130131 A1* | 6/2007 | Porter et al. | 707/3 |
| 2007/0208697 A1* | 9/2007 | Subramaniam et al. | 707/3 |
| 2007/0244863 A1* | 10/2007 | Adams et al. | 707/3 |
| 2007/0244867 A1* | 10/2007 | Malandain et al. | 707/3 |
| 2007/0260620 A1 | 11/2007 | Smolen et al. | 707/100 |
| 2007/0299704 A1 | 12/2007 | Wildhagen et al. | 705/7 |
| 2008/0027971 A1* | 1/2008 | Statchuk | 707/102 |
| 2008/0147457 A1 | 6/2008 | Rapp | 705/7 |
| 2008/0275844 A1* | 11/2008 | Buzsaki et al. | 707/3 |
| 2008/0281901 A1 | 11/2008 | Lusher et al. | 709/202 |
| 2009/0024599 A1 | 1/2009 | Tata | 707/708 |
| 2011/0093478 A1 | 4/2011 | Starks et al. | 707/754 |
| 2012/0069131 A1* | 3/2012 | Abelow | 348/14.01 |

\* cited by examiner

SEARCH SERVER ARCHITECTURE USING A SEARCH ENGINE ADAPTER

This application claims the benefit, under 35 U.S.C. §119 (e), of U.S. Provisional Application No. 60/981,367, filed Oct. 19, 2007, entitled "Data Source-Independent Search System Architecture," and naming Hari K. Gutlapalli, Shirish K. Kothari, Suhas R. Mehta, and Wai Pak as inventors. The above-referenced application is hereby incorporated by reference herein in its entirety.

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

FIELD OF THE INVENTION

This invention relates to the field of enterprise-wide data searching, and more particularly relates to a search system a search system architecture.

BACKGROUND OF THE INVENTION

Businesses' ever-increasing reliance on information and the computing systems that produce, process, distribute, and maintain such information in its various forms, puts great demands on techniques for efficiently accessing that information. Business organizations can produce and retain large amounts and varieties of information (and normally do so, in fact). Searching for specific data has thus become an integral part of many enterprise applications.

Various business units within an enterprise can maintain data using a variety of searchable objects. A searchable object is a representation of a set of one or more joined tables that contain data. A searchable object can have table-like behavior such as an ability to query a set of records within those joined tables. Commonly, the data types within a searchable object are complex and varied.

In today's world, search has become an integral part of enterprise/customer relationship management (CRM) applications, for example. In a typical CRM application used by communications companies, for example, thousands of call center agents create/update millions of records on a daily basis. In such an environment, a typical call center agent performs numerous search operations during a workday in order to get to the correct record(s) to assist their customers quickly and efficiently.

Additionally, it is common for an enterprise to run multiple applications (e.g., an enterprise resource planning (ERP) system, CRM application, human resource management system (HRMS) application, and the like), possibly from different vendors catering to various needs of the enterprise. Moreover, each of these applications may need to use different search engines.

A centralized search system can be used to coordinate searching for desired data among various locations where data may be stored. It is important to optimize the search system's configuration in order to get precise, relevant and accurate search results.

In an attempt to provide such advantages, older search systems employ search techniques that tightly integrate searching mechanisms with the user interface. These mechanisms are neither flexible nor configurable, and provide only a proprietary user interface for searching a database. Existing search architectures therefore do not provide the ability to modify the system to employ a new search engine. In other words, a user cannot, with minimal effort and downtime, replace an existing search engine with a new one. In present systems, the search engine is tightly woven into the architecture stack. Hence, even a small change, such as adding a new field to a search category, forces the application server to be shutdown, thereby potentially affecting the productivity of tens of thousands of users.

A typical change requires at least the following operations:
1) Modify the search category, as necessary
2) Shutdown the server
3) Re-compile various portions of the system
4) Deploy new module(s) and
5) Restart server Listed below is a list of some of the difficulties facing such earlier search architectures:
1) Inability to modify system to employ a new search engine.
2) Inflexibility: Modification of the searchable fields and indexable fields is not possible without bringing down the server. The architecture and implementation are tightly woven, and closely integrated with a specific search engine. Inability to allow integration of a new search engine with the existing search user interface is also problematic.
3) Database Dependence: Database (DB) support is provided by the search engine. For every new DB to be supported by the enterprise application, the search engine is required to support DB connectors for the new DB. Hence, if the underlying search engine is upgraded to a newer version of open database connectivity (ODBC) drivers or cannot support a database, the search capability of the application is severely compromised. (ODBC provides a standard application programming interface (API) method for using database management systems (DBMS).)
4) Pull-Model Indexing: Existing search engines pull the data from a data store, and hence, there is little or no control over the indexing process.
5) Non-existent Incremental Indexing: Due to the use of a pull-model, there is no automatic incremental indexing. An administrator is required to manually start full indexing or do a manual refresh process from time-to-time. Thus, the data seen by users is typically stale.
6) Non-intuitive user interface (UI) for search results: The search results rendering is done in a proprietary list applet, making it less user-friendly.
7) Tight integration with a single engine.
8) Complex configuration and server down time required
9) No search category grouping.
10) Difficult to integrate additional data connectors.
11) Completely dependent on search engine database support.
12) Complex customization.
13) Redundancy in executing repetitive searches.

Therefore, it is desirable to have a mechanism that permits search access to a number of data stores (of varying types), without the need for costly downtime of the enterprise-wide search system. Moreover, the system should allow for multiple search engines, again without the need for extensive modification of the existing search architecture. Further still, such a system should provide for efficient searching by allowing a user to specify a number of data stores, rather than only one, or all, such data stores, when performing a search.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

Introduction

Figure 1:
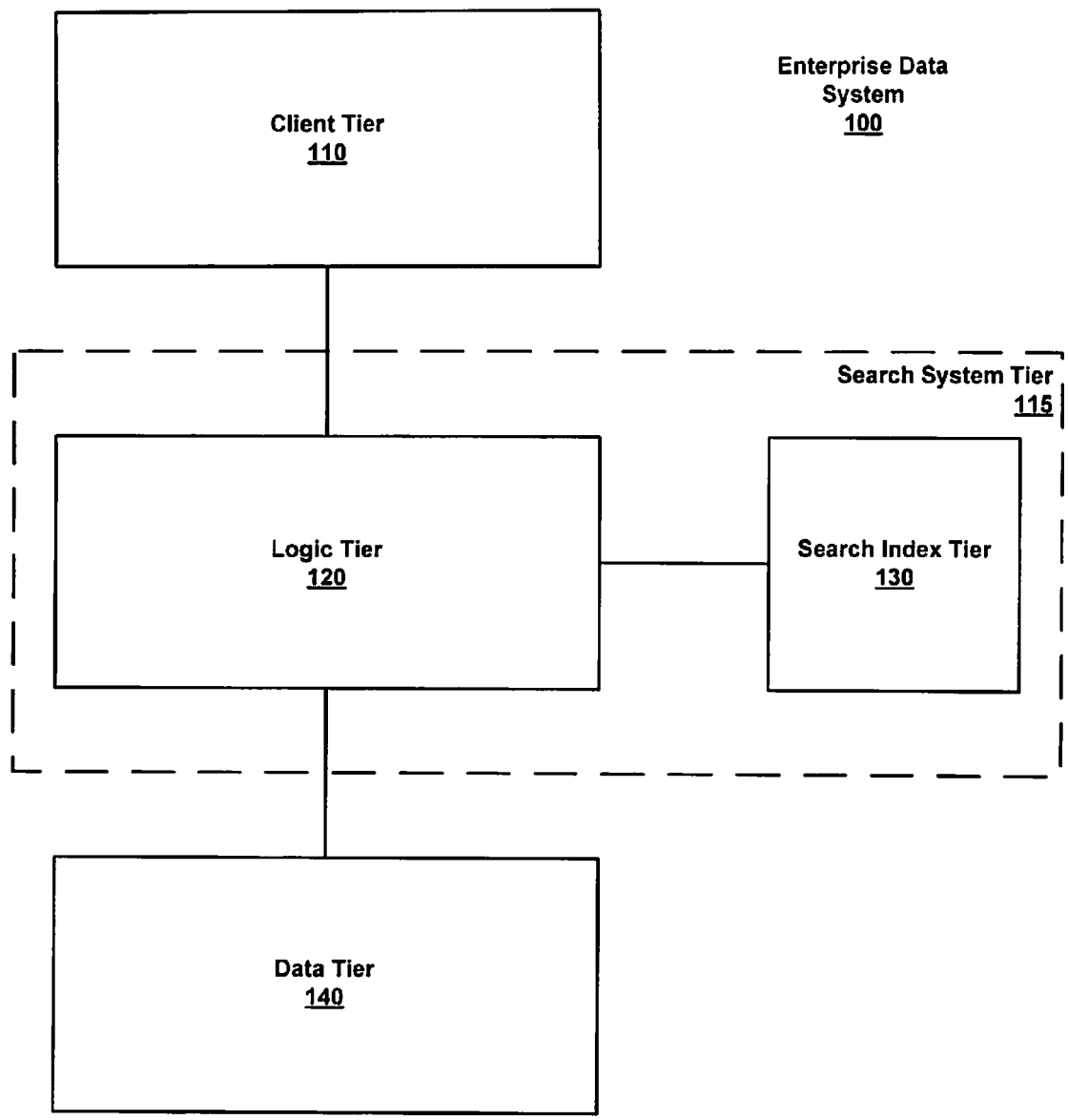
FIG. 1 is a block diagram illustrating an enterprise data system according to an embodiment of the present invention.

The present invention provides a mechanism for a search system that is flexible and configurable. Such functionality is provided through the use of a mechanism that permits search access to a number of data source (of varying types), without the need for costly downtime of the enterprise-wide search system. Moreover, the system allows for multiple search engines, again without the need for extensive modification of the existing search architecture. Further still, such a system can provide for efficient searching by allowing a user to specify a number of data stores, rather than only one, or all, such data stores, when performing a search.

The search architectures described subsequently provide an example of representative enterprise data systems according to architectures of the present invention, as well as their operation. This architecture is flexible and loosely coupled with the search engines, and is based on a flexible and configurable object architecture. This allows "pluggability" for search engines to integrate with enterprise applications. The entire search configuration can be performed using the client application and hence, with any changes to the system's configuration requiring a re-login, at most. This is in contrast to existing systems, which require the restarting of the search server, for example. A configuration file (e.g., a field-mappings file; e.g., using a format such as the extensible markup language (XML)), enables dynamic configurability and can be used to govern the definition of business component (also referred to herein as "BusComp") based search categories. The search categories and fields to be indexed can be pre-defined in a standard XML format field mappings file.

An architecture of the present invention supports push-model indexing, thereby absorbing the logic and control for submitting data into the application. This control provides the ability to push the new and/or modified data via automated incremental indexing (e.g., using a repetitive background job), as well as manually refreshing the search index, if required. Additionally, the search engine is decoupled from the database. Finally, the results, irrespective of the individual data source, are rendered inside the application using a generic UI—not using a standard list applet. A search engine, integrated with an enterprise application in the manner of the present invention, can now be treated as a "black box" that consumes data (creates/manages indexes on the engine) and executes searches, and returns results (based on hits on its index).

The present search architecture allows different search engines to be plugged into an enterprise data application of the present invention with minimal disruption and also allows the user to obtain results from these various resources in a single query. In order to "plug" a new search engine into the search server, to integrate with application, one need only write (or re-write) the (search) engine specific adapters (or possibly only a portion thereof, depending on the change). This module works closely with the generic search adapter, which typically includes elements such as a web extensions frame and web templates, business components and search services. This framework is shared across all the search engines that are to be integrated the search architecture.

Advantages therefore include, but are not limited to, the following:
1. "Plug-and-Play" architecture provided by loose coupling to search engine(s)
2. Minimal/no configuration and server down time
3. Support for incremental indexing
4. Logical grouping of searchable categories
5. Additional data/database/repository connectors, which can be plugged in with little effort
6. Support for multiple data sources
7. Support for multiple search engines
8. Database independence (doesn't depend on the search engine)
9. Simple customization (e.g., administrative interface and configuration file)
10. Persistent searches Examples of Enterprise Data Systems According to the Present Invention FIG. 1 is a block diagram of an enterprise data system 100, in which a system of the present invention can be implemented. Enterprise data system 100 includes a client tier 110, a search system tier 115 (which, in turn, includes a logic tier 120 and a search index tier 130), and a data tier 140. Client tier 110 accesses data tier 140 via search system tier 115 (and so, logic tier 120). Client tier 110 is able to search the data residing in data tier 140 via capabilities provided by search index tier 130 to logic tier 120.

Figure 2:
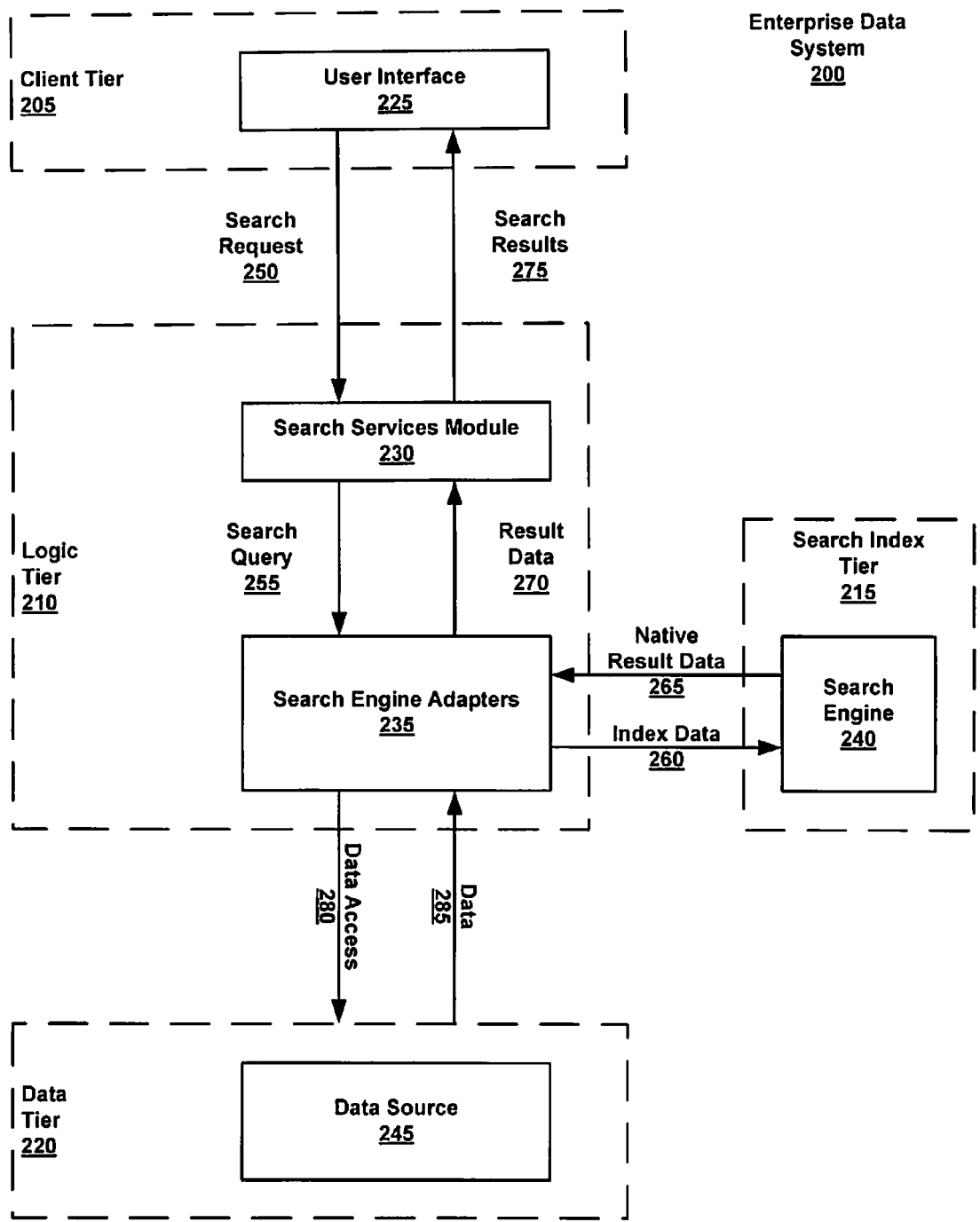
FIG. 2 is a block diagram illustrating an enterprise data system according to an embodiment of the present invention.

FIG. 2 illustrates in greater detail examples of components of an enterprise data system such as enterprise data system 100 of FIG. 1. An enterprise data system 200 is thus depicted in FIG. 2 as including a client tier (depicted in FIG. 2 as a client tier 205), a logic tier (depicted in FIG. 2 as a logic tier 210), a search index tier (depicted in FIG. 2 as a search index tier 215) and a data tier (depicted in FIG. 2 as a data tier 220). Client tier 205 is depicted in FIG. 2 as including a user interface 225, which represents the interface for communicating with logic tier 210 (and so search index tier 215 and data tier 220), to a user of enterprise data system 200.

In turn, logic tier 210 is depicted in FIG. 2 as including search services module 230 and search engine adapters 235. Search engine adapters 235 provide for communications between search services module 230 and elements of search index tier 215 and data tier 220. In so doing, search engine adapters 235 provide a generic interface to search services module 230, while allowing search services module 230 to be agnostic to the specifics of components within search index tier 215 and data tier 220.

Search services 230 can be implemented as objects, for example. Such objects need not be tied to specific objects, but rather, can operate or act upon objects to achieve a particular goal. Such services can be reused, and can be used by external systems to communicate with applications. Such objects can be configured to work with a set of properties, which can be set through the use of administrative tools. Search services 230 can also store information regarding searches performed (e.g., during a given session), using caching, for example. By supporting such storage, search services module 230 is able to support persistent searches.

Search engine adapters 235 can be implemented as driver dynamic link libraries (DLLs), for example. Using the present disclosure, such driver DLLs can be implemented by third parties (using what is referred to herein as a "Third Party Interface"). The interface for a particular search can then be implemented internally or by a third party vendor. These DLLS support the plug-and-play mechanism for search engines in embodiments of the present invention. Using this approach, a third-party search engine is then able to plug into the application by implementing the third party interface.

Search index tier 215 includes a search engine 240, which allows for the searching of data residing in data tier 220. This data is represented in FIG. 2 as a data source 245 within data tier 220.

User interface 225 communicates a search request 250 to search services module 230 in logic tier 210. Search request 250 can be in a standard format, and so, for example, can be communicated as a property set. Search services 230 then communicates search request 250 to search engine adapters 235 as a search query 255. Search query 255 can be, and preferably is, in a standard generic format. For example, search query 255 can be communicated using an extensible markup language (XML). Search engine adapters 235 then communicate search query 255 to search engine 240 as index data 260. Index data 260 will typically be in a native database format.

Search engine 240 performs the request search, and returns its results as native result data 265. As with index data 260, native result data 265 will typically be in a native database format. Search engine adapters 235 communicate these results to search services module 230, as result data 270. In the manner of the earlier-discussed communications between search services module 230 and search engine adapters 235 (e.g., search query 255), result data 270 can be, and preferably is, in a standard generic format (e.g., XML). Search services 230 then communicate these results from logic tier 210 to user interface 225 within client tier 205, as search results 275. As before, communications between user interface 225 and search services module 230 can be, and preferably are, in a standard format, such as property sets. User interface 225 receives search results 275, and then presents these results to the user.

Should the user desire further information on one or more of the results in search results 275, the user once again employs user interface 225 to communicate refined search requests information (search request 250) to search services module 230. Search services 230 once again sends search query 255 (appropriately modified to reflect the additional information desired by the user) to search engine adapters 235. Search engine adapters 235 then perform a data access 280 in order to access the data in data source 245. Data source 245 then returns the requisite data as data 285. Data access 280 and data access 285 are preferably communicated between search engine adapters 235 and data source 245 using a standard format such as XML. Additionally, a data abstraction layer can be implemented between search engine adapters 235 and data source 245, either as a separate module, or (from at least the perspective of search engine adapters 235) as part of data tier 220. In one embodiment, this data abstraction layer is implemented as one or more virtual business components.

Regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements/components of a computer system). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", "communicatively coupled" or "operably coupled", to each other to achieve the desired functionality.

Figure 3:
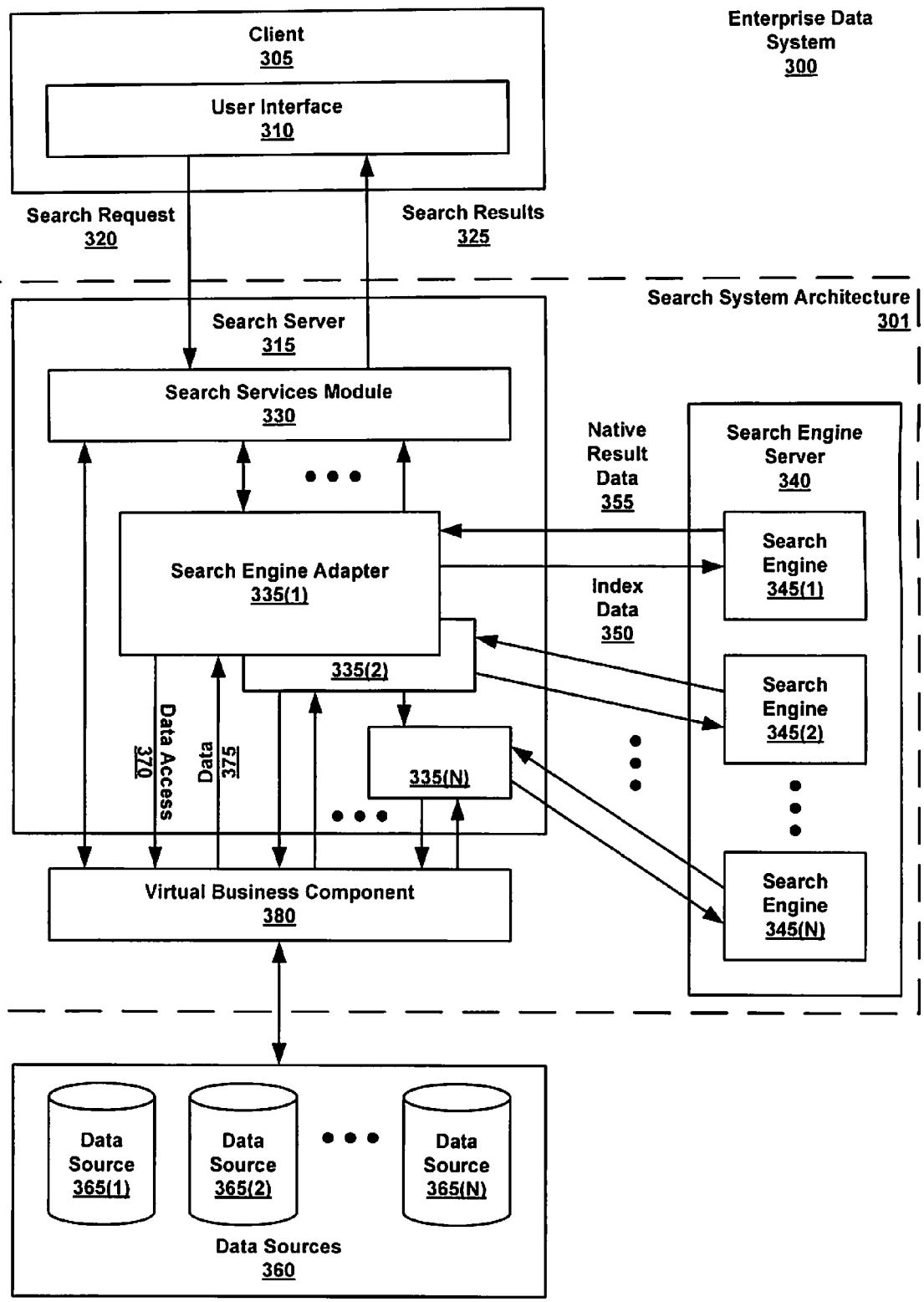
FIG. 3 is a block diagram illustrating an enterprise data system according to an embodiment of the present invention.

FIG. 3 is a block diagram of an enterprise data system 300 depicting an example of an implementation of an enterprise data system, such as those depicted in FIGS. 1 and 2. Enterprise data system 300 includes a search system architecture 301, which includes a number of elements, as described subsequently. As before, a client 305 (within a client tier) supports a user interface 310. User interface 310 communicates with a search server 315 of search system architecture 301 by sending a search request 320 and receiving search results 325, to/from search services module 330, respectively, which resides on search server 315. Search services 330 communicate with a number of search engine adapters (depicted in FIG. 3 as search engine adapters 335(1)-(N)) in a manner such as that depicted in FIG. 2 (as search query 255 and result data 270).

In the aforementioned manner, for example, search engine adapter 335(1) is able to communicate with a search engine residing on a search engine server 340 of search system architecture 301. A number of search engines of the present invention are depicted in FIG. 3 as search engines 345(1)-(N). Thus, search engine adapter 335(1) communicates with search engine 345(1) by sending index data 350, and subsequently receiving native result data 355. While search engine adapters 335(1)-(N) and search engines 345(1)-(N) are depicted in FIG. 3 as having a one-to-one relationship, a single search engine adapter can be implemented to support more than one search engine, and access to a given search engine can be implemented so as to allow search services module 330 to use two or more of search engine adapters 335(1)-(N). Thus, the number of each need not be equal, or even comparable.

Moreover, it will be noted that the variable identifier "N" is used in several instances in FIG. 3 to more simply designate the final element (e.g., search engine adapters 335(1)-(N) and search engines 345(1)-(N)) of a series of related or similar elements (e.g., search engine adapters and search engines). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

If further information with respect to the data thus identified is desired, the user can "drill down" (delve further into the data identified). Thus, in the manner discussed with regard to access by search engine adapters 235 to data source 245 in FIG. 2, search engine adapters 335(1)-(N) access data sources 360 (depicted in FIG. 3 as including data sources 365(1)-(N)) to get whatever additional information is desired and available. To do so, one or more of search engine adapters 335(1)-(N) sends a request for further information on a given search or search results (depicted in FIG. 3 as a data access 370). In response, the one or more of search engine adapters 335(1)-(N) receives the requested additional information (depicted in FIG. 3 as data 375). As is depicted in FIG. 3, search engine adapters 335(1)-(N) access data sources 360 via a virtual business component 380 of search system architecture 301.

Virtual business component 380 can represent external data as a business component. This allows the user to represent external data as a business component within an application. Virtual business component 380 also allows search services (e.g., search services module 330) to transfer data directly to user interface 310 on client 305, as shown in FIG. 3.

Virtual business component 380, in the manner discussed with regard to the data abstraction layer of a virtual business component, provides a data abstraction layer that allows search engine adapters 335(1)-(N) to access data sources 365(1)-(N) of data sources 360 in an abstract manner. This allows search engine adapters 335(1)-(N) to access the various data sources within data sources 360 (e.g., various databases having various formats, file systems having various formats, flat-file databases, electronic mail in various formats, resources on the Internet, resources within an enterprise's internal network and many other such data sources). Thus, search server 315 is able to provide access to searchable data located within a heterogeneous set of searchable objects provided by a variety of vendors. Data sources 365 thus correspond to the searchable objects that can include databases, file systems, portals, electronic mails, and other electronically-accessible data sources. As can also be seen in FIG. 3, virtual business component 380 also provides an interface that is accessible by search services module 330. As with search engine adapters 335(1)-(N), the interface provided by virtual business component 380 to search services module 330 is preferably a standardized generic format, such as would be provided by its implementation using XML.

The architecture illustrated in FIG. 3 can therefore provide a variety of types of searches. Examples of such searches include keyword searches, full text searches, single item/multiple item searches, Boolean expression searches, and synonym searches, among other such searches. In addition, the search system in FIG. 3 can provide for sorting results of searches and refining searches through various functionalities provided by search server 315. Provision of the various functionalities can also result in different user interface screens being provided to a user throughout a session (though this can be minimized or eliminated, if a strictly uniform user interface is desired).

Search services 330 is configured, in part, through the use of a search index. By referencing the search index, the search services can provide the user interface with information identified by values provided for searching using the searchable fields available to the user. A search index can be built by providing a mapping between the searchable fields in the search index and the related fields found within the searchable objects of interest. Embodiments of the present invention provide such a mapping through the use of a modifiable field mapping file. The field mapping file provides information necessary to make a linkage between fields of the search index and fields of a variety of searchable objects. A user can be provided with the ability to modify the field mappings file, and if such a modification is performed then the searchable index can be modified at runtime to provide access to or deny access to fields affected by such a modification of the field mappings file.

Figure 4A:
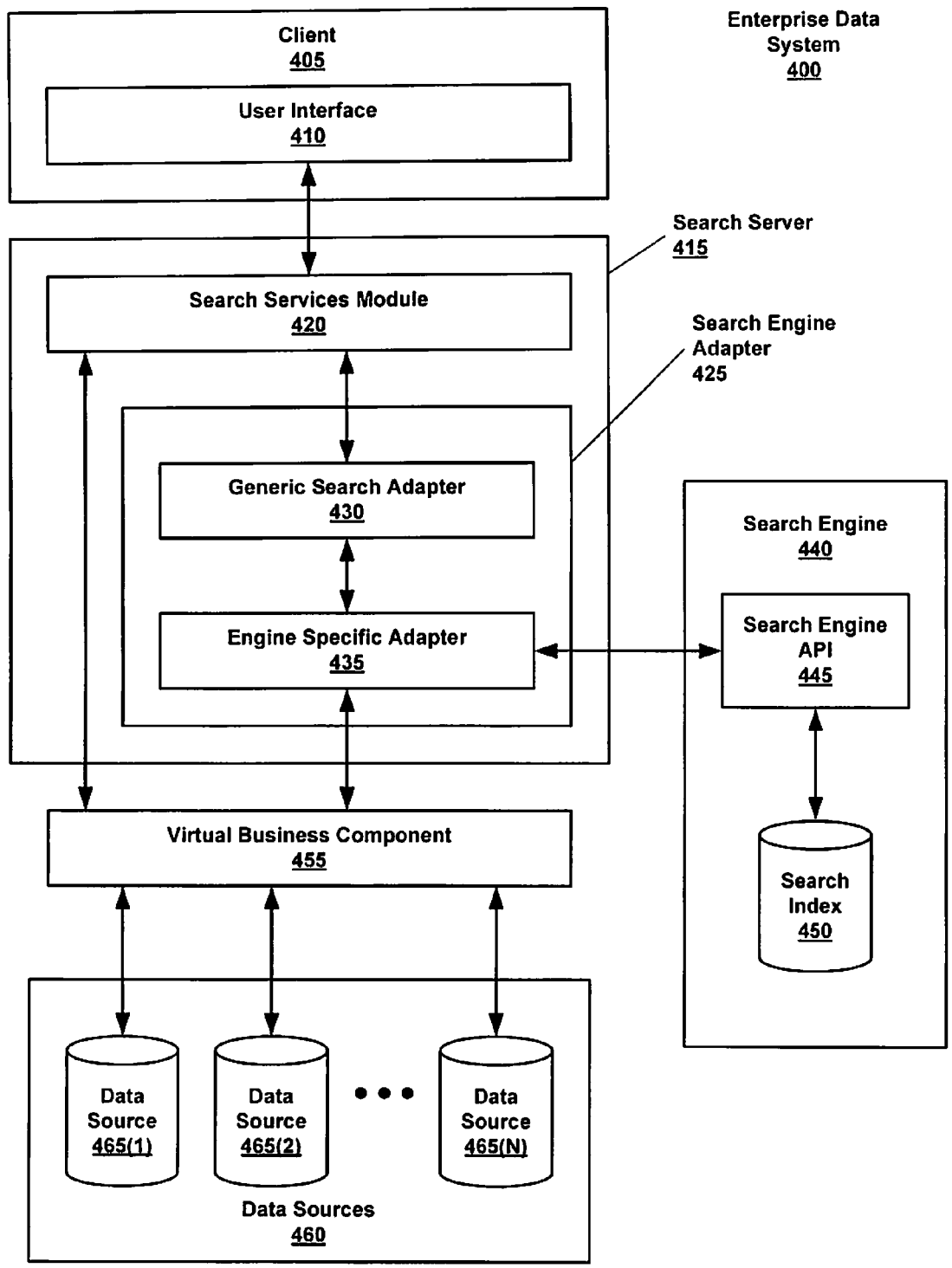
FIG. 4A is a block diagram illustrating an enterprise data system according to an embodiment of the present invention.

FIG. 4A is a block diagram of an enterprise data system 400 that depicts various features of a search engine adapter in greater detail. As before, a client 405 provides a user interface 410 to a user of enterprise data system 400. User interface 410 interfaces with a search server 415 on which a search services module 420 and a search engine adapter 425 reside. As depicted in FIG. 4A, search engine adapter 425 includes a generic search adapter 430 and an engine specific adapter 435. Generic search adapter 430 provides a standardized generic interface for search engine adapter 425 (e.g., using XML), and is accessible by search services module 420. Generic search adapter 430 communicates with engine specific adapter 435 in accessing a search engine 440 using a format such as XML or property sets. Engine specific adapter 435 is implemented so as to use a search engine application programming interface (API) 445 to access search engine 440.

As will be appreciated in light of the present disclosure (and particularly, search engine adapters 335(1)-(N)), rather than a number of search engine adapters such as search engine adapter 425, a number of search engines (e.g., search engines 345(1)-(N), of which search engine 440 is an example) can also be implemented by providing a number of search engine adapters (of which search engine adapter 425 is an example), although such a configuration is not shown in FIG. 4A for the sake of simplicity. It will be further appreciated that the implementation of multiple search engine adapters does not mandate the implementation of multiple generic search adapters—a single generic search adapter can be configured to support multiple search engine adapters. Further, a combination of generic search adapters can be implemented to provide some combination of 1:1 or 1:N support for multiple search engine adapters. Again, such alternatives, though contemplated by the present disclosure, are not shown in FIG. 4A for the sake of simplicity. Search engine 440 presents search engine API 445 to search engine adapter 425 such that engine specific adapter 435 is able to access a search index 450 of search engine 440 in order to provide search services module 420 with the information requested by the user via user interface 410.

In the manner noted earlier with regard to FIG. 3, search engine adapter 425, via engine specific adapter 435 and a virtual business component 455, is provided access to data sources 460. Data sources 460, as depicted in FIG. 4A, include a number of data sources (depicted in FIG. 4A as data sources 465(1)-(N)). Although depicted and referred to in the singular, virtual business component (VBC) 455 can be implemented as a set of VBCs, if needed (as will be discussed subsequently), though including a number of elements. Virtual business component 455 allows search services module 420 and search engine adapter 425 (via engine specific adapter 435) to access data sources 465(1)-(N) in a uniform and generic manner. As such, virtual business component 455 will, in fact, typically include a number of business objects (not shown in FIG. 4A, for the sake of simplicity), and can, for example, include a business object corresponding to each of data sources 465(1)-(N).

Figure 4B:
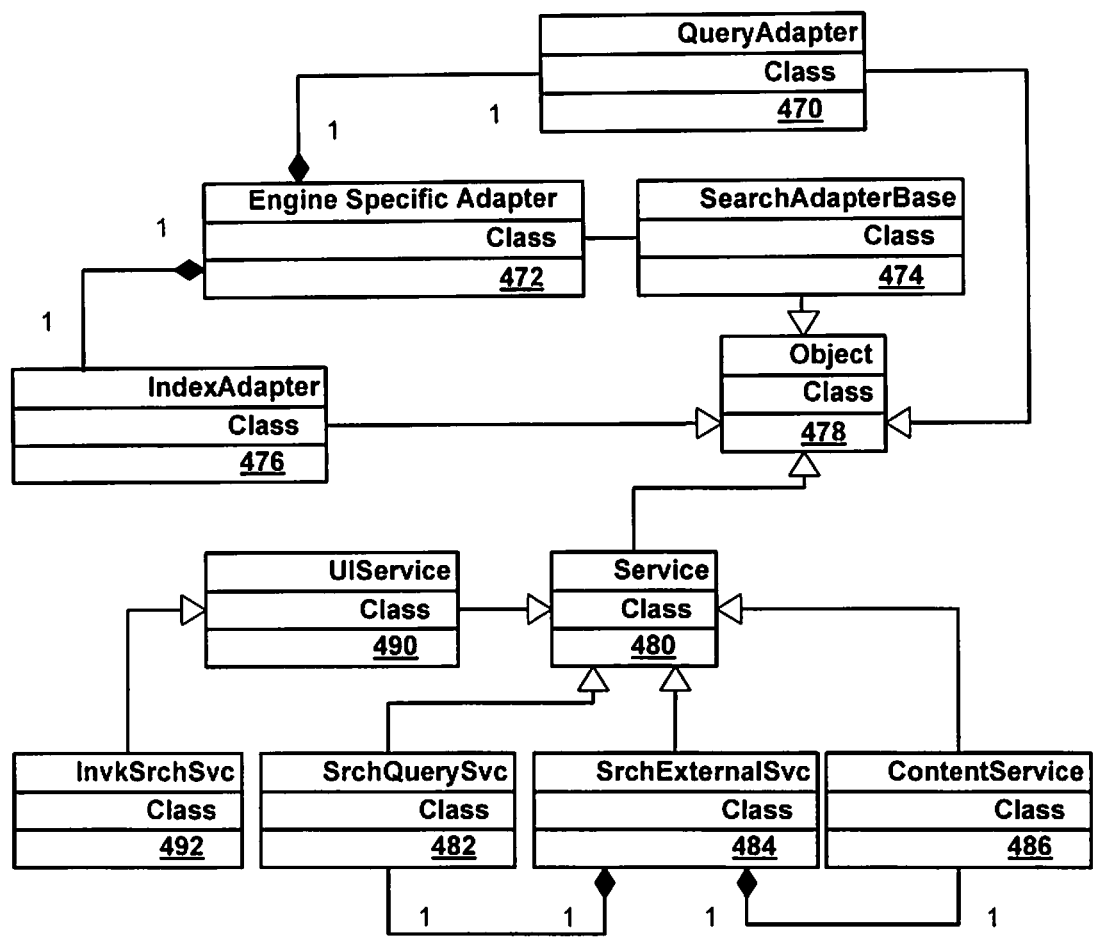
FIG. 4B is a low-level class diagram for an enterprise data system according to an embodiment of the present invention.

FIG. 4B is a low-level class diagram for an enterprise data system such as those depicted in FIGS. 2, 3 and 4A. As will be appreciated, a class diagram is a type of static structure diagram that describes the structure of a system by showing the system's classes, their attributes, and the relationships between the classes. An example of modeling such relationships is the use of the Unified Modeling Language (UML), which is used in FIG. 4B. The low-level class diagram of FIG. 4B includes:

A QueryAdapter Class 470
An EngineSpecificAdapter Class 472
A SearchAdapterBase Class 474
An IndexAdapter Class 476
An Object Class 478
A Service Class 480
A SearchQueryService Class 482
A SearchExternalService Class 484
A ContentService Class 486
A UIService Class 490
An InvokeSearchService Class 492

In the low-level class diagram of FIG. 4B, QueryAdapter Class 470 is composed of EngineSpecificAdapter Class 472, and these classes have a 1:1 relationship. QueryAdapter Class 470 has a relationship with an aggregation of object classes (represented in FIG. 4B by ObjectClass 478). In turn, EngineSpecificAdapter Class 472 has an association with SearchAdapterBase Class 474. SearchAdapterBase Class 474 has a relationship with an aggregation of object classes (represented in FIG. 4B by ObjectClass 478). IndexAdapter Class 476 is composed of EngineSpecificAdapter Class 472, in a 1:1 relationship, and has a relationship with an aggregation of object classes (represented in FIG. 4B by ObjectClass 478).

Service Class 480 also has a relationship with an aggregation of object classes (represented in FIG. 4B by ObjectClass 478). InvokeSearchService Class 492 has a relationship with UIService Class 490, which, in turn, has a relationship with Service Class 480 (and so ObjectClass 478). SearchQueryService Class 482, SearchExternalService Class 484 and ContentService Class 486 each also have a relationship with Service Class 480 (and so ObjectClass 478). SearchQueryService Class 482, SearchExternalService Class 484 and ContentService Class 486 also have relationships among themselves. Both SearchQueryService Class 482 and ContentService Class 486 are composed of SearchExternalService Class 484, and these classes have a 1:1 relationship.

In terms of UML, the foregoing thus implies that all other classes in FIG. 4B inherit the basic characteristics of objects from ObjectClass 478. Similarly, QueryAdapter Class 470 is a type of EngineSpecificAdapter Class 472 (and ObjectClass 478). In turn, EngineSpecificAdapter Class 472 is a type of SearchAdapterBase Class 474. IndexAdapter Class 476 is a type of EngineSpecificAdapter Class 472 (and ObjectClass 478). Service Class 480 is also a type of ObjectClass 478. In turn, UIService Class 490, as well as SearchQueryService Class 482, SearchExternalService Class 484 and ContentService Class 486, are each a type of Service Class 480. InvokeSearchService Class 492 is a type of UIService Class 490. SearchQueryService Class 482 and ContentService Class 486 are each a type of SearchExternalService Class 484.

Using the low-level classes of FIG. 4B, search services according to embodiments of the present invention can be made independent of the underlying adapter such search services might use. Among other advantages, this independence allows search engine adapters to be swappable. These search services include services such as a Search External Service. An example of an API for a Search External Service is provided in Table 1.

TABLE 1

SearchExternalService Class.

SrchExternalSvc

−m_pSearchAdapter : CSSSearchAdapterBase*
+Index (inout inputArgs : CCFPropertySet, inout outputArgs : CCFPropertySet) : ErrCode
+InitiateSearch (inout inputArgs : CCFPropertySet, inout outputArgs : CCFPropertySet) : ErrCode
+GetEngine (inout outputArgs : CCFPropertySet) : ErrCode
+GetParams (inout outputArgs : CCFPropertySet) : ErrCode
+GetSearchParamOptions (inout outputArgs : CCFPropertySet) : ErrCode
+RefreshIndex (inout inputArgs : CCFPropertySet, inout outputArgs : CCFPropertySet) : ErrCode
+Search (inout inputArgs : CCFPropertySet, inout outputArgs : CCFPropertySet) : ErrCode
+SetAdapterClass ( ) : ErrCode
+SetDefaultProps( ) : ErrCode
+SetEngine ( ) : ErrCode
+SetParams(inout inputArgs : CCFPropertySet) : ErrCode
+SetSearchOptions (inout inputArgs : CCFPropertySet) : ErrCode
+SetUserProps( ) : ErrCode
+ShowResults (inout inputArgs : CCFPropertySet, inout outputArgs : CCFPropertySet) : ErrCode Table 2 shows the Invoke Search Center Service API, which is responsible for controlling the user interface presented to the user, in support of the search functionality described herein.

TABLE 2

InvokeSearchService Class.

InvkSrchSvc

−OpenSearch ( ) : ErrCode
+GotoSearchView (inout inputArgs : CCFPropertySet, in outputArgs : CCFPropertySet) : ErrCode
+GotoAdvancedSearchView (inout inputArgs : CCFPropertySet, in outputArgs : CCFPropertySet) : ErrCode
+AutoSearch (inout inputArgs : CCFPropertySet, in outputArgs : CCFPropertySet) : ErrCode
−PrepareToOpenSearch ( ) : ErrCode
−PostCloseSearch ( ) : ErrCode
−RefreshSearchCenter ( ) : ErrCode Table 3 shows the Content Service API. This class is responsible for indexing services, and is designed to handle not only a "fresh" index request but also incremental indexing. In addition, this class provides a mechanism to perform synchronous (client-side) or asynchronous (server-side) indexing.

TABLE 3

ContentService Class.

ContentSvc

−m_pContentAdapter : CSSSearchAdapterBase*
−IncrementalIndex(inout inputArgs : CCFPropertySet, inout outputArgs : CCFPropertySet) : ErrCode
−IndexFromClient (inout inputArgs : CCFPropertySet, inout outputArgs : CCFPropertySet) : ErrCode
−IndexFromServer (inout inputArgs : CCFPropertySet, inout outputArgs : CCFPropertySet) : ErrCode
−RefreshIndex (inout inputArgs : CCFPropertySet, inout outputArgs : CCFPropertySet) : ErrCode
−UpdateIndex (inout inputArgs : CCFPropertySet, inout outputArgs : CCFPropertySet) : ErrCode
+BenchTest ( )

Table 4 shows the Search Data Processor Service API. This class is responsible for delegating indexing services on the server side. This class is designed to handle not only "fresh" index request but also incremental indexing. In addition, this class provides a mechanism to perform synchronous (client-side) or asynchronous (server-side) indexing.

TABLE 4

SearchDataProcessorService Class.

SrchDataProcessorSvc

−CreateFullIndex(inout inputArgs : CCFPropertySet, inout outputArgs : CCFPropertySet) : ErrCode
−CreateIncrementalIndex (inout inputArgs : CCFPropertySet, inout outputArgs : CCFPropertySet) : ErrCode Given that each search adapter is typically crafted to access a specific search engine, each such search adapter can be specific to its respective underlying search engine. In fact, there need not be any interaction between the search adapters for different search engines, though such search adapters can be designed to communicate with one another, if desired. In the former case, each such search adapter can be stored in a separate directory, thereby allowing compilation into separate DLLs. As will be appreciated in light of the present disclosure, a generic search adapter can also be created, to serve as a default search adapter, or a search adapter providing basic functionality common to all data sources (or some subset thereof).

Table 5 shows the API design for a search engine adapter (Search Engine Adapter (Adapter) API). This adapter deals with searches, as well as indexing/administrative functionality.

TABLE 5

SearchEngineAdapter (Adapter) Class.

Adapter

−m_pSearchAdapter : CSSOSESSearchAdapter*
−m_pIndexAdapter : CSSOSESIndexAdapter*
−m_pAdminAdapter : CSSOSESAdminAdapter*
+InvokeMethod (in pMethodName : SSchar*, inout inputArgs : CCFPropertySet, inout outputArgs : CCFPropertySet) : ErrCode
+Initialize (inout inputArgs : CCFPropertySet, inout outputArgs : CCFPropertySet) : ErrCode
ExecuteSearch (inout inputArgs : CCFPropertySet, inout outputArgs : CCFPropertySet) : ErrCode
Index (inout inputArgs : CCFPropertySet, inout outputArgs : CCFPropertySet) : ErrCode
IncrementalIndex (inout inputArgs : CCFPropertySet, inout outputArgs : CCFPropertySet) : ErrCode
RefreshIndex (inout inputArgs : CCFPropertySet, inout outputArgs : CCFPropertySet) : ErrCode
DoAdminTask (inout inputArgs : CCFPropertySet, inout outputArgs : CCFPropertySet) : ErrCode The Search Engine Adapter (Adapter) Class is responsible for, among other functions, receiving requests from the search services above, and then delegating these search requests to their corresponding sub-adapter classes. The Search Engine Adapter (Adapter) Class receives requests for performing searches, indexing and/or administrative tasks. The search, index and administrative requests are delegated to the Query Adapter Class, Index Adapter Class and Administrative Adapter Class, respectively.

In light of the foregoing, any business service need only acquire a reference to an instance of the Search Engine Adapter (Adapter) Class to propagate such requests and obtain responses thereto. The search service can dynamically instantiate the adapter using a generic search adapter reference and at runtime binds it to the actual engine specific code. At runtime, the search service binds the adapter to the actual engine-specific code.

A sample of such code appears as:

```
if (SSstricmp (pMethodName, METHOD_EXECUTESEARCH) == 0)
{
    DO (ExecuteSearch (inputArgs, outputArgs));
}
else if (SSstricmp (pMethodName, METHOD_INDEX) == 0)
{
    DO (Index (inputArgs, outputArgs));
}
```

Table 6 shows the API design for the Query Adapter API.

TABLE 6

QueryAdapter Class.

QueryAdapter

+Initialize (inout inputArgs : CCFPropertySet, inout outputArgs : CCFPropertySet) : ErrCode
+Search (inout inputArgs : CCFPropertySet, inout outputArgs : CCFPropertySet) : ErrCode
+GetNavigationResults (inout inputArgs : CCFPropertySet, inout outputArgs : CCFPropertySet) : ErrCode
+GetKeywords (inout inputArgs : CCFPropertySet, inout outputArgs : CCFPropertySet) : ErrCode The Query Adapter Class is responsible for preparing and submitting search requests to the underlying search engine. The Query Adapter Class then receives the results from the search engine in a standard format (e.g., XML). The Query Adapter Class then converts this standard format (e.g., the XML) into an output format (e.g., Property Set format) and propagates this (the property sets) to the caller classes and up to the UI rendering code.

Table 7 shows the API design for the Index Adapter Class.

TABLE 7

IndexAdapter Class.

IndexAdapter

+Initialize (inout inputArgs : CCFPropertySet, inout outputArgs : CCFPropertySet) : ErrCode
+Index (inout inputArgs : CCFPropertySet, inout outputArgs : CCFPropertySet) : ErrCode
+IncrementalIndex (inout inputArgs : CCFPropertySet, inout outputArgs : CCFPropertySet) : ErrCode
+RefreshIndex (inout inputArgs : CCFPropertySet, inout outputArgs : CCFPropertySet) : ErrCode
+SetModel (in pModel:CSSModel*) : ErrCode This class is responsible for preparing and submitting business data for indexing by the underlying search engine. The Index Adapter Service receives the indexing requests from the UI. The Index Adapter Service collects the relevant information from the UI/database, and then forwards the request to the corresponding service classes for further processing. The query requests are sent to the Search Query Service, while the indexing requests are sent to the Search Content Service.

Examples of Data Model Requirements

Examples of data model requirements are now given in the following tables. Table 8 depicts the data model requirements for search engine settings available to the administrator, and so the information from Table 8 is set by the administrator. As depicted, Table 8 holds the name of the search engine.

TABLE 8

SRCH_ADMIN_ENGINE_SETTINGS.

| | Column | Type | Comment |
|---|---|---|---|
| 1. | ROW_ID | | |
| 2. | NAME | VARCHAR2(50) | Name of the Engine |
| 3. | DESC_TEXT | VARCHAR2(50) | Description |

Table 9 depicts the data model requirements for search administrator engine parameter settings. The information from Table 9 is set by the administrator. This is a child of the search administrator engine settings table (Table 8). As depicted, Table 9 holds the search setting parameters, for example, in the form of name and value pairs.

TABLE 9

SRCH_ADMIN_ENGINE_PARAM_SETTINGS.

| | Column | Type | Comment |
|---|---|---|---|
| 1. | ROW_ID | | |
| 2. | ENGINE_ID | | This is the ROW_ID from SRCH_ADMIN_ENGINE_SETTINGS |
| 3. | NAME | VARCHAR2(50) | Name of the Parameter |
| 4. | VALUE | VARCHAR2(50) | Value of the Parameter |
| 5. | REQUIRED_FLG | BOOLEAN | To indicate if the value for this parameter is needed |

Table 10 depicts a listing of the names in the name and value pairs of the search administrator engine parameter settings table (Table 9).

TABLE 10

Name listing.

| | Names | Comment |
|---|---|---|
| 1. | HOST_NAME | Holds the Host name where search engine is installed. |
| 2. | PORT | Holds the Port where the search engine installed. |
| 3. | TIMEOUT | |
| 4. | SEARCH_PARAM_SPELLCHECK | Boolean parameter while querying |
| 5. | SEARCH_PARAM_FILTER | Boolean parameter while querying |
| 6. | SEARCH_PARAM_LANG | Parameter while querying. |
| 7. | SEARCH_PARAM_SORTBY | Boolean parameter while querying |
| 8. | KEEP_ALIVE | Has a true or false value. |
| 9. | RESULT_PER_PAGE | |
| 10. | DEFAULT_SORT | Can have By relevance, By result type, By result title, By date and the like. |
| 11. | CONTEXT_SENSITIVITY | Can take a value of 1 and 2<br>1. Context sensitive - Search criteria changes based on the selected screen.<br>2. Persistent - Keep the same set of search criteria persistent across screens. |

TABLE 10-continued

Name listing.

| | Names | Comment |
|---|---|---|
| 12. | CRITERIA_RESERVATION | Can take a value of 1 and 2<br>1. Clear previous search criteria when a new search is triggered.<br>2. Resume previous search when a new search is triggered. |
| 13. | DEFAULT_CATEGORY | Indicates the default category. (e.g., Account or Contact) |

Table 11 depicts the data model requirements for search settings. The information from Table 11 is displayed on a per user basis and a per engine basis on search preference screen. It is typically the responsibility of the given Business Component/Business Object to retrieve the details pertaining to a given user and a given search engine from the search settings table.

TABLE 11

SRCH_SETTINGS.

| Column | Type | Comment |
|---|---|---|
| 1. USER_ID | | ROW_ID in User table. |
| 2. VENDOR/ENGINE NAME | VARCHAR2(50) | |
| 3. HOST_NAME | VARCHAR2(50) | Holds the Host name where the search engine is installed. |
| 4. PORT | NUMBER(10, 0) | Holds the Port where the search engine is installed. |
| 5. TIMEOUT | NUMBER(5, 0) | |
| 6. SEARCH_PARAM_SPELLCHECK | Boolean | Boolean parameter while querying |
| 7. SEARCH_PARAM_FILTER | Boolean | Boolean parameter while querying |
| 8. SEARCH_PARAM_LANG | Boolean | Boolean parameter while querying. |
| 9. SEARCH_PARAM_SORTBY | Boolean | Boolean parameter while querying |
| 10. KEEP_ALIVE | Boolean | Has a true or false value. |
| 11. RESULT_PER_PAGE | NUMBER(5, 0) | |
| 12. DEFAULT_SORT | | Can have By relevance, By result type, By result title, By date or the like. |
| 13. CONTEXT_SENSITIVITY | | Can take a value of 1 and 2<br>3. Context sensitive - Search criteria changes based on the selected screen.<br>4. Persistent - Keep the same set of search criteria persistent across screens. |
| 14. CRITERIA_RESERVATION | | Can take a value of 1 and 2<br>3. Clear previous search criteria when a new search is triggered.<br>4. Resume previous search when a new search is triggered. |
| 15. DEFAULT_CATEGORY | | Indicates the default category. Account or Contact |
| 16. ACTIVE_ENGINE | BOOLEAN | This indicates whether the engine is active |

Table 12 depicts the data model requirements for search operator mapping. Shown in Table 12 are the internal operators supported by one embodiment of the present invention. The search operator mapping is used by the engine specific adapter to correlate the internal operators with the engine-supported logical operators.

TABLE 12

SEARCH OPERATOR MAPPING.

| Column | Type | Comment |
|---|---|---|
| 1. ROW_ID | | |
| 2. LOG_OPERATOR | | Can have AND, OR, NEAR etc. |

Table 13 depicts the data model requirements for search save table. As depicted, Table 13 holds the information about a search, that is then saved.

TABLE 13

SRCH_SAVE.

| Column | Type | Comment |
|---|---|---|
| 1. ROW_ID | | |
| 2. USER_ID | | |
| 3. CREATED_BY | | |
| 4. CREATED | | |
| 5. LAST_UPDATED | | |
| 6. LAST_UPDATED_BY | | |
| 7. MODIFICATIONS | | |
| 8. CACHE_RESULT_FLAG | | |
| 9. DESC_TEXT | | Comment field |
| 10 PRIVATE_FLG | | Indicates whether other users can view this search. |
| 11 QUERY_STRING | | |
| 12 NAME | | Name of the saved search. |
| 13 CATEGORY | | Category to which the search belongs |
| 14 SEARCH_TYPE | | Such as "Basic," "Advanced" and the like |

Table 14 depicts the data model requirements for a search category table. As depicted, Table 14 holds category information, which can be obtained from information stored in certain administrative tools, for example. A mapping between the category table and the collections is used, which can be stored in the administrative tools repository.

TABLE 14

SRCH_CATEGORY.

| Column | Type | Comment |
|---|---|---|
| 1. ROW_ID | NUMBER(10, 0) | |
| 2. CATEGORY_NAME | VARCHAR2(50) | Relates to category in the Repository like Accounts, Contacts, Opportunities etc. These are the Look In value in Basic search and Look In values in Advanced search. |
| 3. DRILL_DOWN_VIEW | VARCHAR2(50) | This is the view to which the user is taken on clicking the link from the result view. |
| 4. PARENT_CATEGORY_ID | NUMBER(10, 0) | If the category is the child of another category, this holds the parent's category ID. |

Table 15 depicts the data model requirements for search category collection table. As depicted, Table 15 holds information regarding the collection(s) to which a category belongs. This can be a temporary table. A method in the search service is called to insert/update this value.

TABLE 15

SRCH_CATEGORY_COLL.

| Column | Type | Comment |
|---|---|---|
| 1. ROW_ID | NUMBER(10, 0) | |
| 2. PAR_ROW_ID | NUMBER(10, 0) | This is the ROW_ID in SRCH_CATEGORY |
| 3. COLLECTION_NAME | VARCHAR2(50) | |

Table 16 depicts the data model requirements for search category field mappings. As depicted, Table 16 holds the field mappings for a given search category. For a given search category, the search category fields can be displayed in a result view screen mapping, as well as the fields to be referred, upon further inspection of that result view.

TABLE 16

SRCH_CATEGORY_FIELD_MAPPING.

| Column | Type | Comment |
|---|---|---|
| 1. ROW_ID | NUMBER(10, 0) | |
| 2. PAR_ROW_ID | NUMBER(10, 0) | ROW_ID of the SRCH_CATEGORY |
| 3. FIELD_NAME | VARCHAR2(50) | Refers to the fields that are used for the category. These fields can be used while drilling down on a particular category result view. |
| 4. Display in Result View | Boolean | Identifies if the field can be displayed in the result view or not. |
| 5. Sequence | NUMBER(2, 0) | Order in which the fields are displayed. |

Table 17 depicts the data model requirements for an advanced search of a data source. As depicted, Table 17 holds the name of the data source. Table 17 is used to obtain the data source values in an advanced search operation, and is stored at the administrative tools level.

TABLE 17

SRCH_ADV_DATASOURCE.

| Column | Type | Comment |
|---|---|---|
| 1. ROW_ID | NUMBER(10, 0) | |
| 2. DATA_SOURCE_NAME | VARCHAR(50) | |

Table 18 depicts the data model requirements for an advanced search of a user data source. As depicted, Table 18 holds the name of the data source. Table 18 is used to obtain data source values in an advanced search operation, and is stored at the application level.

TABLE 18

SRCH_USR_DATASOURCE.

| Column | Type | Comment |
|---|---|---|
| 1. ROW_ID | NUMBER(10, 0) | |
| 2. USER_ID | | |
| 3. DATA_SOURCE_NAME | VARCHAR(50) | |

Table 19 depicts the data model requirements for an advanced search of a given file format Table 19 is used to get file format values in an advanced search operation. Table 19 is stored at the administrative tools level.

TABLE 19

SRCH_ADV_FILE_FORMAT.

| Column | Type | Comment |
|---|---|---|
| 1. ROW_ID | NUMBER(10, 0) | |
| 2. FILE_FORMAT | VARCHAR(50) | |

Table 20 depicts the data model requirements for an advanced search of a given user file format Table 20 is used to get file format values in an advanced search operation. Table 20 is stored at the application level.

TABLE 20

SRCH_USR_FILE_FORMAT.

| Column | Type | Comment |
|---|---|---|
| 1. ROW_ID | NUMBER(10, 0) | |
| 2. USER_ID | | |
| 3. FILE_FORMAT | VARCHAR(50) | |

Table 21 depicts the data model requirements for a search using a user-selected logical operator. Table 21 corresponds to a menu selection of "Perform Using," which performs a search using the requisite operator(s) in an advanced search.

TABLE 21

SRCH_USER_LOGICAL_OPERATOR.

| Column | Type | Comment |
|---|---|---|
| 1. ROW_ID | NUMBER(10, 0) | |
| 2. LOG_AND | Boolean | |
| 3. LOG_OR | Boolean | |

Table 22 depicts the data model requirements for a search using a user criteria. Table 22 corresponds to a menu selection of "Search Criteria," which performs a search using the requisite criteria in an advanced search.

TABLE 22

SRCH_USER_CRITERIA.

| Column | Type | Comment |
|---|---|---|
| 1. ROW_ID | NUMBER(10, 0) | |
| 2. CRITERIA_CONTAINS | Boolean | |
| 3. CRITERIA_MATCHES | Boolean | |

Figure 5:
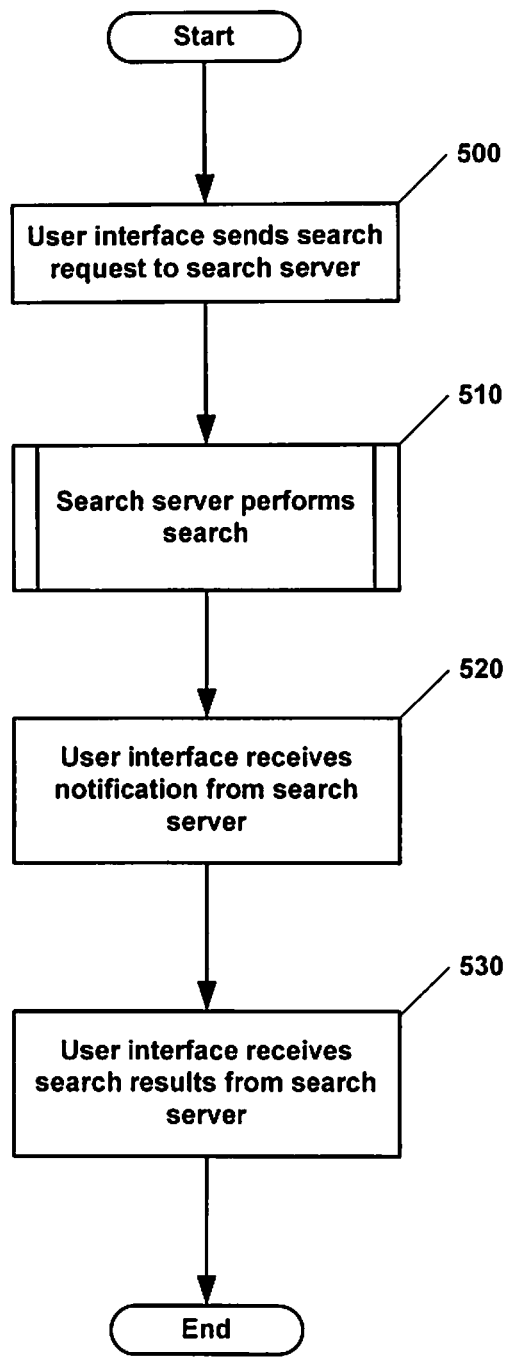
FIG. 5 is a flow diagram illustrating the operations performed in processing a search request according to an embodiment of the present invention.

Operational Examples of Enterprise Data Systems According to the Present Invention FIG. 5 is a flow diagram illustrating a process of the present invention that can be performed by enterprise data systems such as those depicted in FIGS. 2, 3 and 4A. For example, the process of FIG. 5 can be implemented by enterprise data system 200.

In such a system, the process of the present invention begins with a user interacting with a user interface. The user interface 225 sends a search request to a search server, and more particularly, to a search services module (step 500). The search frame of the user interface passes the search text and category (or categories) to a search execution virtual business component. Virtual business components are used (rather than regular business components) because the data, in terms of search results, come from an external data source (namely, search indices). The virtual business component passes the search to the search services of a search server.

Figure 6:
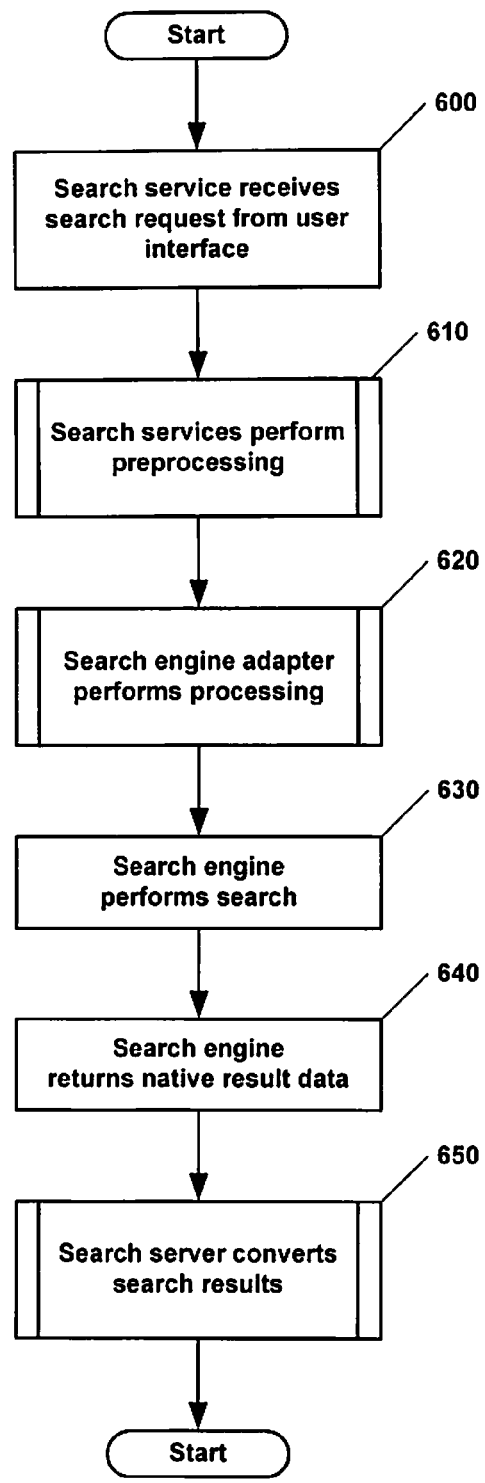
FIG. 6 is a flow diagram illustrating the operations performed in processing a search request according to an embodiment of the present invention.

Next, the search server performs the requested search, as depicted in greater detail in FIG. 6 (step 510). The search server, having performed the search, returns search results to the user interface (step 520). The user interface, in turn, receives the search results from the search server, and presents these results to the user (step 530).

As noted, FIG. 5 depicts a flow diagram illustrating a process according to one embodiment of the present invention. It is appreciated that operations discussed herein may consist of directly entered commands by a computer system user or by steps executed by application specific hardware modules, but the preferred embodiment includes steps executed by software modules, or by operations performed by hardware modules. The functionality of steps referred to herein may correspond to the functionality of modules or portions of modules.

The operations referred to herein may be modules or portions of modules (e.g., software, firmware or hardware modules). For example, although the described embodiment can include software modules and/or manually entered user commands, the various example modules can be implemented as application-specific hardware modules. If implemented as software modules, embodiments of the present invention can include script, batch or other executable files, or combinations and/or portions of such files. Such software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system such as the computer system described subsequently herein. Thus, the methods described herein, the operations thereof and modules therefore may be executed on a computer system configured to execute the operations of the method and/or may be executed from computer-readable storage media. The method may be embodied in a machine-readable and/or computer-readable storage medium for configuring a computer system to execute the method. Thus, software modules of embodiments of the present invention may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The software modules described herein may be received by such a computer system, for example, from computer-readable storage media. The computer-readable storage media may be permanently, removably or remotely coupled to the computer system. The computer-readable storage media may non-exclusively include, for example, any number of the following: magnetic storage media including disk and tape storage media, optical storage media such as compact disk media (e.g., CD-ROM, CD-R, etc.) and digital video disk storage media, nonvolatile memory storage memory including semiconductor-based memory units such as FLASH memory, EEPROM, EPROM, ROM or application specific integrated circuits, volatile storage media including registers, buffers or caches, main memory, RAM, and the like. In a UNIX-based embodiment, such software modules may be embodied in a file which may be a device, a terminal, a local or remote file, a socket, a network connection, or other expedient of communication or state change. Other new and various types of computer-readable media may be used to store and/or transmit the software modules discussed herein.

FIG. 6 is a flow diagram illustrating an example of operations that a search server (e.g., search server 315 or search server 415) would perform in executing the search operations discussed with regard to FIG. 5. Such a search process begins with the search service receiving a search request from the user interface (step 600). Next, a search service on the search server performs search service preprocessing (step 610). The process of search service preprocessing is described in further detail with regard to FIG. 7.

Once the search service preprocessing has been performed, the search services module sends the preprocessed search request to a search engine adapter in the form of a search query (step 620). As noted earlier, the search request can be communicated in the form of one or more property sets, while the search query can be communicated in a standardized generic format such as XML.

One example of the conversion a property set to an XML string is now presented:

```
// This method converts a property set to an XML string.
ErrCode CSSExternalBusSvc :: ToXML (CCFPropertySetInput,
CCFPropertySetOutput)
{
    // declare local property sets
            .................. . . .
            ................ . . .
    // Setup example property set structure
            paramArgs.SetType (SStext ("query"));
            paramArgs.SetValue (SStext(""));
            paramArgs.SetProperty (SStext ("xmlns"), SStext
("http://schemas.XYZ.com/xxx.xxx"));
    // set up structure for protocol and port
            ................... . . .
            ..................... . . .
    //build the root XML node
            headerArgs.SetType (SStext ("xxxxxx"));
            headerArgs.SetValue (SStext (""));
            headerArgs.SetProperty (SStext ("xmlns"),
                    SStext ("http:// schemas.XYZ.com/xxx.xxx "));
    //consolidate the structure. Order in which property set
    // is appended determines the hierarchy of the XML.
            headerArgs.AppendChild (paramArgs);
            headerArgs.AppendChild (protocolArgs);
            headerArgs.AppendChild (portArgs);
        // Build and add SOAP msg header,
        // if will be called as webservices.
        // Construct XML string (only an example)
            soapHeaderArgs.SetType (SStext ("SOAP-ENV:Header"));
            soapHeaderArgs.SetValue (SStext (""));
            soapHeaderArgs.AppendChild (headerArgs);
            soapMsgArgs.AppendChild (soapHeaderArgs);
            soapMsgArgs.AppendChild (*soapBodyArgs);
    // convert xml hierarchy in the property set to xml document
            DOCHILD (m_pModel, GetService (EAI_SVC_NAME_XMLHIER_CNV,
pXMLHierConvSvc));
            CCF_ASSERT (pXMLHierConvSvc);
    // build the communication protocol and conversion standards
            xmlHier.AppendChild(soapMsgArgs);
            transportInHier.AppendChild(xmlHier);
            transportInHier.SetProperty(SStext ("EscapeNames"),
SStext ("FALSE"));
            transportInHier.SetProperty
(EAI_METHARG_XML_CHAR_ENCODING, SStext ("UTF-8"));
transportInHier.SetProperty(EAI_METHARG_XMLCNV_ADD_CRLF_PARAM,
SStext ("false"));
            transportInHier.SetProperty
(EAI_METHARG_GEN_PROC_INSTR_PARAM, SStext ("false"));
    // Output XML is in transportInDoc,
    // as one name and value pair.
            DOCHILD (pXMLHierConvSvc, InvokeMethod
(EAI_METHOD_HIER_TO_DOC, transportInHier,
                    transportInDoc));
```

Once the search engine adapter receives the search query, the search engine adapter performs search engine adapter processing on the search query (step 620). The process of search engine adapter processing is described in further detail with regard to FIG. 8.

The search request, having been preprocessed by the search services and processed by the search engine adapter, is then sent to a search engine as index data. Using this information, the search engine is able to perform the requested search (step 630). The search engine then returns the results thus identified as native result data to the requesting search engine adapter (step 640). Via processing by the search engine adapter and the search services, the search server converts the native result data into search results that are then provided by the search services to the user interface (step 650). The processes performed in converting the native result data into search results for consumption by the user interface (by the search services module and the search engine adapter) are discussed in further detail with regard to FIG. 9.

Figure 7:
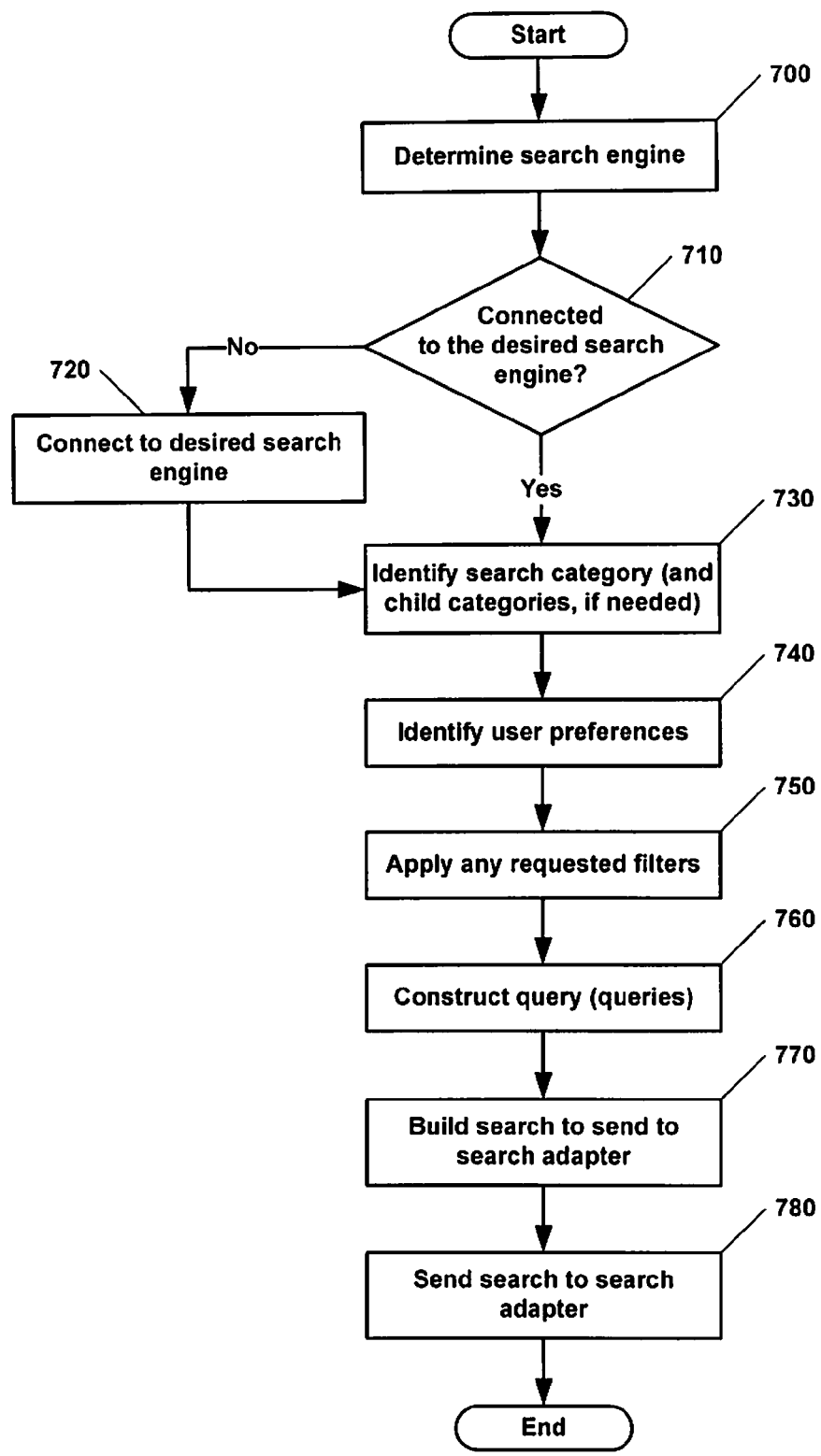
FIG. 7 is a flow diagram illustrating the operations performed in processing a search request according to an embodiment of the present invention.

FIG. 7 is a flow diagram illustrating in greater detail the operations performed by search services in performing search services preprocessing. In embodiments employing the process depicted in FIG. 7, the process of search services preprocessing begins with a determination by the search service as to which search engine(s) have been requested for use in performing the given search (step 700). The search services then determine whether the search server (via one or more search engine adapters) is connected to the desired search engine(s) (step 710). If the search server is not connected to the desired search engine(s), the search services makes calls to various administrative services, that in turn create a connection to the search server to the desired search engine(s) (step 720).

Once connected to the desired search engine(s), the search services identify the desired search categories, and if needed, attendant child categories (step 730). The search services then identify any user preferences communicated to the search server in the given search request (step 740). The search services then apply any filters requested by the user (step 750). The search services, using this information and other information in the search request, then constructs the query or queries necessary to effect the search requested by the user (step 760). With the query (or queries) thus constructed, the search services then build one or more searches to send to the search adapter using the standardized generic format employed in communications between the search services and the search engine adapters (step 770). The search (or searches) thus constructed are then sent to the requisite search adapter(s) (step 780).

The following is an example of a template of a search request created using XML:

```
<search>
    <engine name="SearchEgnine">
        <action name="query" value="Basic Search">
            <category>xxxxxxxx</category>
            <constraints>
                    <Last Name>xxx</Last Name>
                    <First Name>xxxx</First Name>
                    <Account>xxxxx</Account>
                    <Email>xxxxx</Email>
                ...... . . .
                ......
            </constraints>
            <Preferences>
                    50
                    <Summary>True</Summary>
                ...... . . .
                ...... . . .
            </Preferences>
        </action>
        <version>1.0</version>
    </engine>
</search>
```

Figure 8:
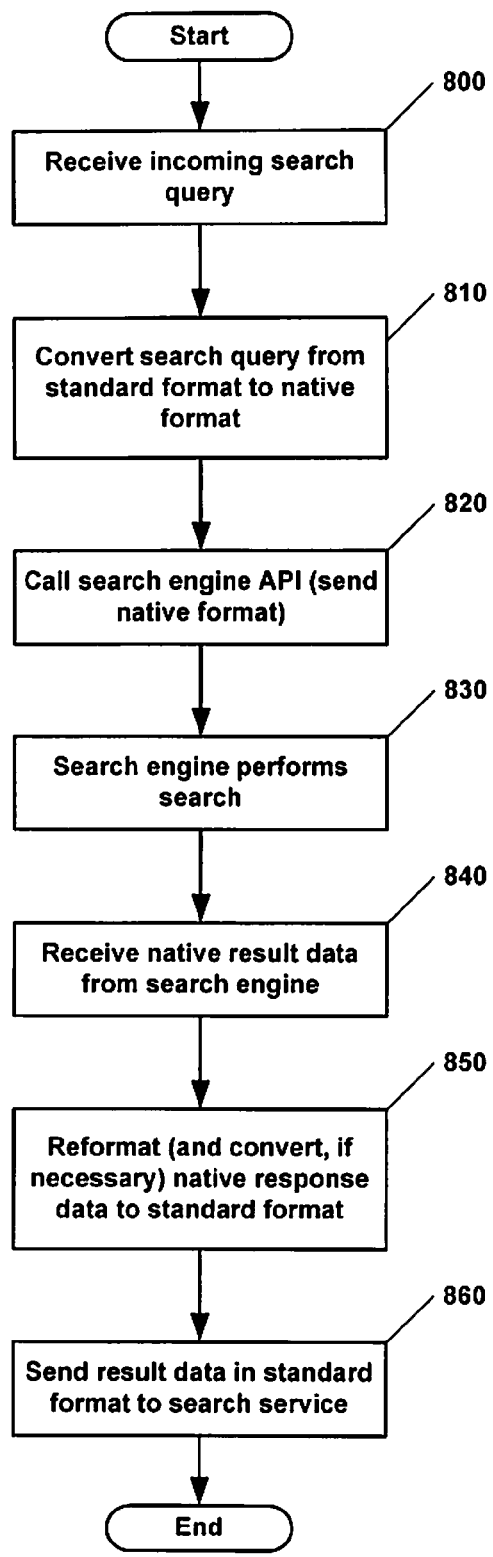
FIG. 8 is a flow diagram illustrating the operations performed in processing a search request according to an embodiment of the present invention.

FIG. 8 depicts a flow diagram according to the present invention, in which an example of search engine adapter processing is described in further detail. Such search engine adapter processing begins with the receipt of an incoming search query, such search query being in the requisite format (and preferably, a standard generic format) (step 800). The search engine adapter receives the incoming search query at a generic search adapter, which then passes the search query to an engine specific adapter. In so doing, the search engine adapter converts the search query from the standard format provided by the search services into a native format that can be passed to the search engine API (step 820). As is depicted in FIG. 3, and as will be appreciated from FIG. 4A, the search services can communicate this information to one or more of the search engine adapters. Similarly, a given generic search adapter can communicate with one or more engine specific adapters, such that a given search engine adapter may include one or more generic search adapters and one or more engine specific adapters. Thus, FIGS. 3 and 4A are simply two examples of the many possible architectures that may be used to implement embodiments of the present invention.

Once called, the search engine API commands (sent to the search engine in native format) cause the search engine to perform the requested search (step 830). Once the search has been performed, the search engine adapter receives the native result data from the search engine at an engine specific adapter that is configured to receive these results (step 840). The search engine adapter (via the engine specific adapter and generic search adapter) then reformats (and converts, if necessary) the native response data into the standard format for presentation to the search service (step 850). This result data is then sent in the standard format to the search service (step 860).

Figure 9:
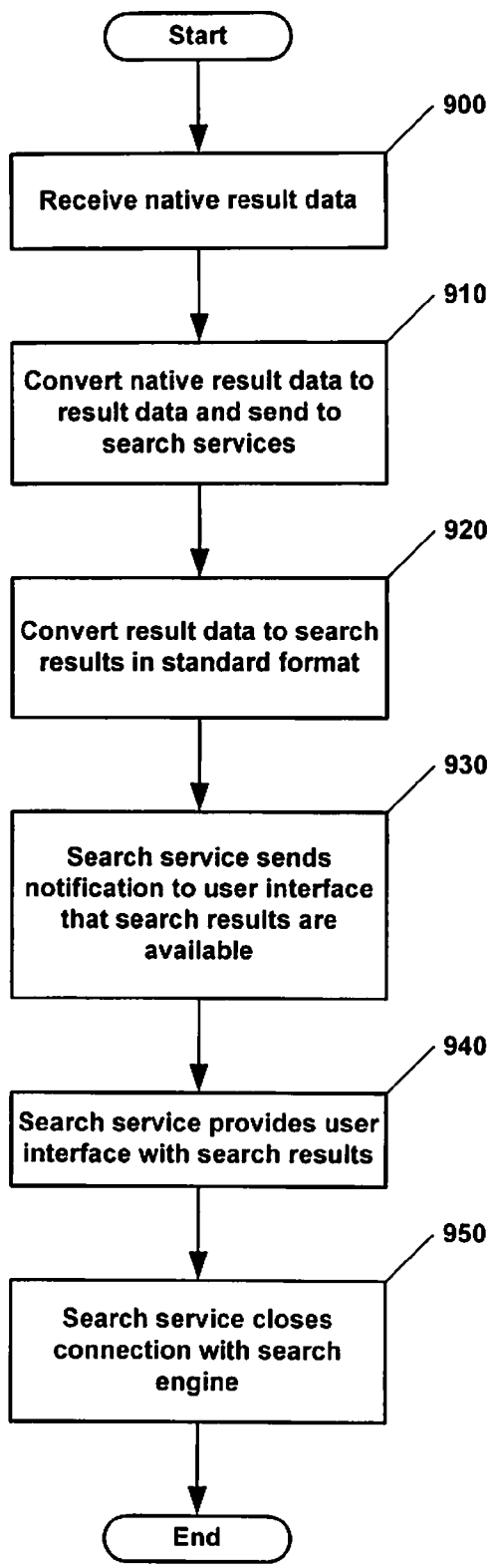
FIG. 9 is a flow diagram illustrating the operations performed in processing a search request according to an embodiment of the present invention.

FIG. 9 is a flow diagram depicting an example of a process of conversion of search results from native results data (e.g., native result data 265 and native result data 355) to search results (e.g., search result 275 and search result 325) by a search server (e.g., search server 315 or search server 415) in further detail. In the embodiment depicted in FIG. 9, the conversion of native result data to search results is performed by a search server, which begins with the receipt of native results data from the search engine, at the search engine adapter on the search server (step 900). The data obtained and provided by the search engine is then converted from the native result format by the search engine adapter, and provided to the search services (step 910). Once provided to the search services, the result data is converted into search results in a standard format, such as property sets (step 920). Once the conversion to a format acceptable to the user interface has been performed, the search service sends a notification to the user interface that the search results are available to the user interface (step 930). On the request of the user interface, the search service provides user interface with the search results (step 940). In order to maintain efficiency and performance for the system of the present invention, the search service can then close the connection between the search server and the search engine server (step 950).

Figure 10:
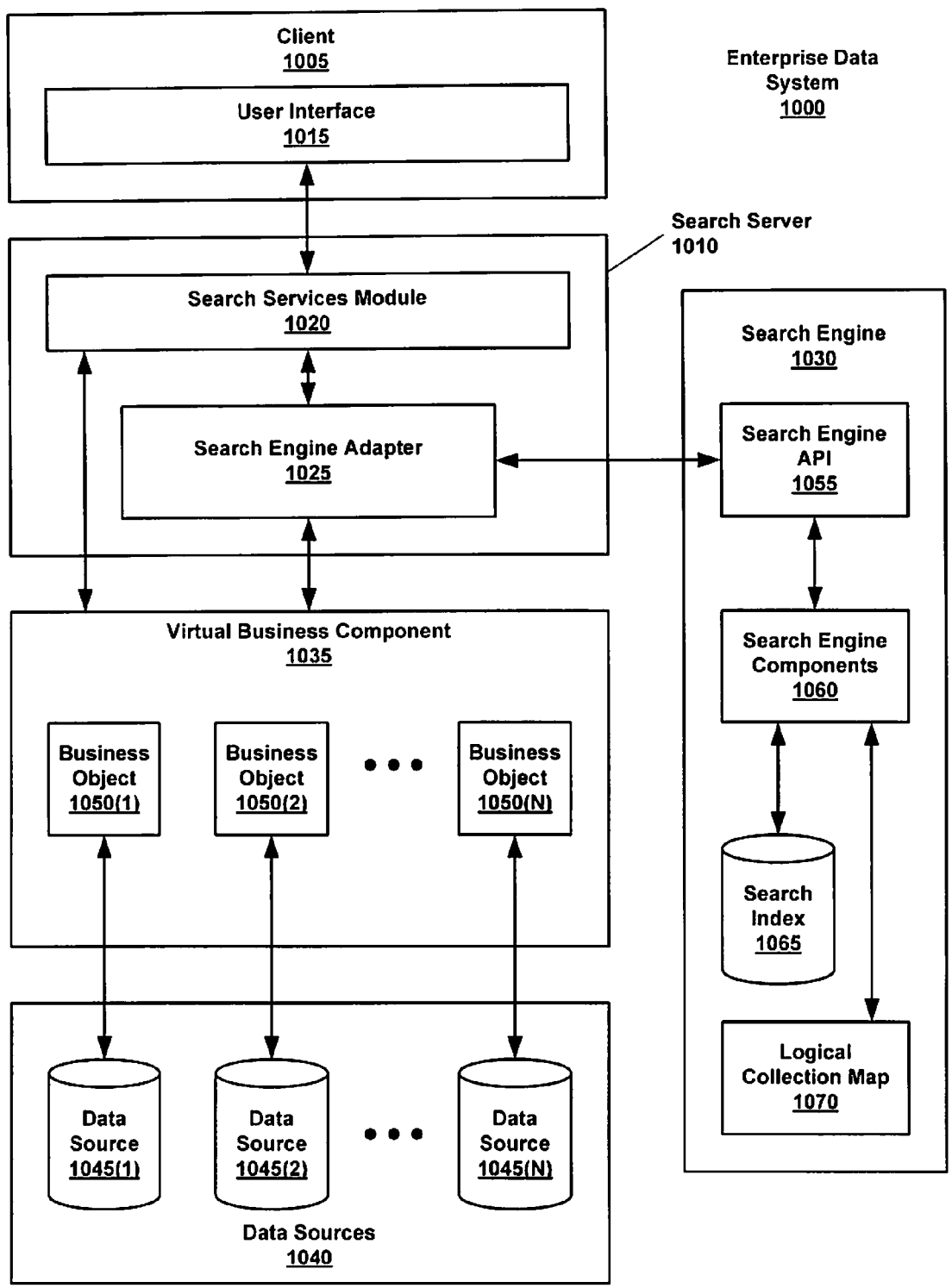
FIG. 10 is a block diagram illustrating an enterprise data system according to an embodiment of the present invention.

FIG. 10 is a block diagram of an enterprise data system 1000 according to embodiments of the present invention. Enterprise data system 1000 includes a client 1005 that is configured to communicate with a search server 1010. Client 1005 presents information to be sent to search server 1010 and information received from search server 1010 via a user interface 1015, in the manner described earlier herein. As also described earlier, search server 1010 includes search services module 1020 and a search engine adapter 1025, which are in communication with one another, as well as the search engine 1030 and a virtual business component 1035.

Virtual business component 1035 is in communication with data sources 1040, which include data sources 1045(1)-(N). In one embodiment, virtual business component 1035 includes a number of business objects 1050(1)-(N). As depicted in FIG. 10, each of data sources 1045(1)-(N) is presented to search server 1010 by one of business objects 1050(1)-(N). In the context of this aspect of the present invention, business objects 1050(1)-(N) can be viewed as logical tables, which, in some embodiments, can then either represent (or even store) data retrieved from their respective data sources (or metadata representing the data in the given data source). For example, such business objects can be implemented using structured query language (SQL) tables.

It will be appreciated that, prior to the present invention, if such a structure were to become relatively large (i.e., include a relatively large number of records), performing searches could become cumbersome, because such searches would take a relatively long time (if individual tables were searched) and/or would often result in an inordinately large number of hits (if all or a large number of such tables were searched globally), or some combination thereof. This is particularly problematic if an enterprise application focuses primarily on an individual business object when searching, which requires a large number of searches because each business object must be searched in such a scenario. Since many enterprises distribute information across multiple business objects, this can lead to gross inefficiency, resulting from the need to perform numerous searches or large global searches.

Two general types of search indices are global indices and individual indices. A global search index (or, more simply, a global index) is one large search index that indexes all the business objects to which the search engine has access. Searches using a global index typically return large number of results (basically, all such results), because effectively all data sources are searched. Alternatively, an individual index is provided. An individual search index (or, more simply, an individual index) indexes a particular business object individually. In this case, then, the search engine accesses only the individual search index for the desired business object. In order to search more than one such data source using such an index alone, more than one search must therefore be performed by the user.

In a system according to embodiments of the present invention, however, such issues are addressed through the use of logical collections of business objects. These logical collections logically group business objects together for purposes of searching. This approach allows searches that are neither global nor individual, but are instead focussed on the desired data from the desired data sources. In embodiments of the present invention, each search index of a given search engine references one or more business objects using one or more references within the set of references that make up the search index. The search index can be used to access a given reference through the use of a keyword, for example. Each keyword maps to one or more references, which in turn each reference one or more business objects.

In the foregoing examples of search indices, embodiments of the present invention allow a user to access business objects using a global index or individual indices using a logical collection by using information associated with the logical collection to reduce the number of business objects searched and/or reduce the number of results thus generated. Regardless of the underlying search index accessed, however, the user need only perform one search operation to obtain the desired result(s), when using embodiments of the present invention.

In the case of a global index, such a search returns only references from those business objects in the logical collection by filtering out those references for business objects not in logical collection (or, alternatively, filtering out those references for business objects not in logical collection). In the case of an individual index, the search engine need access individual search indices only for those business objects in the logical collection. Thus, using the present invention, the search engine does not need to access the search index for each and every business object. Similarly, the user need not repeatedly search the various data sources of interest, and then somehow aggregate the data thus retrieved into a usable collection in a suitable format. When using individual indices, embodiments of the present invention return only references to business objects that are in logical collection, thereby effectively searching only the desired data sources.

An application according to embodiments of the present invention supports the definition of any number of logical collections, each with any combination of searchable business objects therein. In such embodiments, search indexing is typically done at the individual business object level, although such an indexing approach is not mandatory. As will be apparent from the present discussion, when a search is executed on a logical collection, the results from the search engine are based on hits from any of the business objects within the logical collection. The implementation and use of logical collections thus allows for the searching of data from multiple business objects using a single search. This reduces the number of searches a user would otherwise have to perform to get to the requisite information.

The use of a logical collection begins with the logical collection's definition. By defining a logical collection, the user defines the collection of business objects to be searched. To search a logical collection, the identifier for logical collection (the logical collection identifier or LCID) is used to access the appropriate LCID entry in a given logical collection table (also referred to herein as a logical collection map) within the search engine. The logical collection table maps a logical collection (using the LCID) to the business object(s) represented therein using one or more business object identifiers (BOIDs).

Table 23 is an example of the logical correspondences in a logical collection table (in which a logical collection of business objects is represented by the logical collection table). In the manner noted, a logical collection table such as Table 23 contains information that includes a set of logical collection identifiers (LCIDs) and business object identifiers (BOIDs), among other associated information.

TABLE 23

An example of a logical collection.

| Logical Collection Identifier | Business Object Identifiers |
|---|---|
| LCID1 | BOID1 |
|  | BOID2 |
|  | BOID7 |
| LCID2 | BOID3 |
|  | BOID5 |
|  | BOID6 |
| LCID3 | BOID4 |
|  | BOID5 |

As will be appreciated in light of the present discussion, such logical collection tables can be made customizable, and so can include any number of LCIDs, each of which can be a collection of any of the business objects available to the user for searching. This allows the user interface to display, and the user to select, one or more business objects (e.g., as a list of BOIDs, text representing each BOID or business object, or the like) and logical collections (e.g., as a list of LCIDs, text representing each LCID or logical collection, or the like) for searching.

In the example presented in Table 23, each logical collection is represented by a corresponding LCID, and the logical collection represented by each LCID is as follows:

1) LCID1 = BOID1 + BOID2 + BOID7
2) LCID2 = BOID3 + BOID5 + BOID6
3) LCID3 = BOID4 + BOID5

Thus, the user interface allows the user to select any one of BOID1, BOID2, BOID3, BOID4, BOID5, BOID6 or BOID7 for searching individually. Additionally, the user interface allows the user to select any one of LCID1, LCID2 or LCID3 for searching, thereby allowing the user to efficiently search the business object(s) corresponding to the logical collection without the user having to repetitively search business object after business object, and then somehow assemble the results.

In operation, one or more keywords and LCID are sent to the appropriate search engine. The search engine uses the LCID as an index into the appropriate logical collection table to identify the business object(s) to be searched (as identified by their respective BOID). The search engine then performs the requested search. The operations performed depend on the type of search to be performed, which in turn depends on the search index to be employed.

In the case of a global search, the search engine uses a global search index, which returns all results that satisfy the given search. These results are then filtered using the business object identifier (the BOID, as specified by the given LCID) and record number (from the reference identified by the keyword) to choose records that satisfy the search. Thus, given the requisite keyword(s) and LCID, the search engine uses the LCID to identify the business object(s), and the keyword(s) to identify the record(s), from which results are to be provided to the user. The user thus receives the desired results, via the user interface, only from the business object(s) in the logical collection.

In the case of an individual search, the search engine uses the individual indices for the business object(s) identified by the selected logical collection. Using the LCID which identifies the selected logical collection, the business object(s) identified by the BOID(s) of the logical collection are searched using the given keywords. This identifies one or more references into each of the business objects identified by the logical collection. Each of these references refers to a record in its respective business object(s), allowing retrieval of this information to satisfy the given search. Thus, when using individual search indices, the LCID and keyword(s) combination allows for the identification of the requisite business object(s) and record(s) therein.

According to embodiments of the present invention, the path from logical collection to desired record(s) can thus proceed as follows. The logical collection's LCID is used to identify the business object(s) (by BOID) that represent the data source(s) the user wishes to search. Using a logical collection, the logical collection's LCID and desired keyword(s) are sent to the search engine. Using the LCID and keyword(s), the search engine is able to return only the references that are in the logical collection (thus returning some, but not all, references to which the keyword(s) might map). The LCID (and so BOID(s)) is used to determine which search index (indices), of the given search engine, are to be used in searching. A search engine's search index uses keywords as tags for the reference(s) associated with the given keyword, serving to map a keyword to its corresponding reference(s). The combination of keyword(s) and search index thus results in one or more references. Each of these references represents a record identifier (e.g., record number, but more simply, record) and the BOID of the business object in which the desired record can be found. A reference, as discussed herein, therefore represents one or more records in one or more business objects. As will be appreciated in light of the present disclosure, a business object (and so, data source) can have multiple indices, but will typically have at least an individual index and a global index. Thus, a search index contains one or more keywords, each of which provide access to one or more references, each of which in turn references one or more records in one or more business objects.

Table 24 represents an example of keyword/reference/record correspondence, according to embodiments of the present invention.

TABLE 24

An example of keyword/reference correspondence.

| Keyword | Reference Number | Record/BOID |
|---------|------------------|-------------|
| Keyword1 | Reference1 | Record12/BOID1 |
| | Reference6 | Record27/BOID1 |
| | | Record34/BOID2 |
| | | Record56/BOID7 |
| | Reference9 | Record04/BOID2 |
| Keyword2 | Reference2 | Record95/BOID1 |
| | | Record33/BOID2 |
| | Reference4 | Record42/BOID1 |
| | Reference8 | Record58/BOID7 |
| Keyword3 | Reference3 | Record22/BOID2 |
| | Reference7 | Record31/BOID2 |
| | | Record48/BOID7 |
| ... | ... | ... |

As can bee seen in Table 24, each reference references one or more business objects. In one embodiment of the present invention, a search engine need only search the business object(s) of interest because only a subset references are searched and those references typically only reference a subset of the business objects (even in the aggregate). It will be appreciated that, although business objects are identified (by BOID) in Table 24, this is done merely to delineate one record from another (in another business object). The fact that the desired record is within the given business object is simply a result of the search engine's use of the given search index (as a result of the business object's BOID being one of those in the logical collection created/selected by the user). The processes by which global and individual search indices are used, as well as searching using such indices, are discussed in further detail in connection with FIGS. 11 and 12.

It should be noted that, while the present depiction is certainly within the scope of the present invention, the data abstraction layer provided by virtual business component 1035 does not require such a one-to-one correspondence. Multiple business objects can thus be used to represent a single data source, and conversely, multiple data sources can be represented by a single business object. In the manner previously discussed, data sources 1045(1)-(N) can be any number and type of sources of data, metadata, databases and other such sources of data.

As can be seen in FIG. 10, as in earlier figures, search services module 1020 and search engine adapter 1025 are able to access virtual business component 1035, in the embodiment depicted in FIG. 10. Search server 1010, via search engine adapter 1025, also accesses search engine 1030 via a search engine API 1055. Search engine API 1055, in turn, is presented as an interface to search engine components 1060. Search engine components 1060 perform the requisite searching using search indices, the storage of which is depicted in FIG. 10 as a search index 1065. Search engine components 1060 also have access to a logical collection map 1070. Search indices such as search index 1065, in combination with logical collection map 1070, permit search engine components 1060 to perform searches of data sources 1045(1)-(N), as indexed by each search engine, in a fast and efficient manner.

Figure 11:
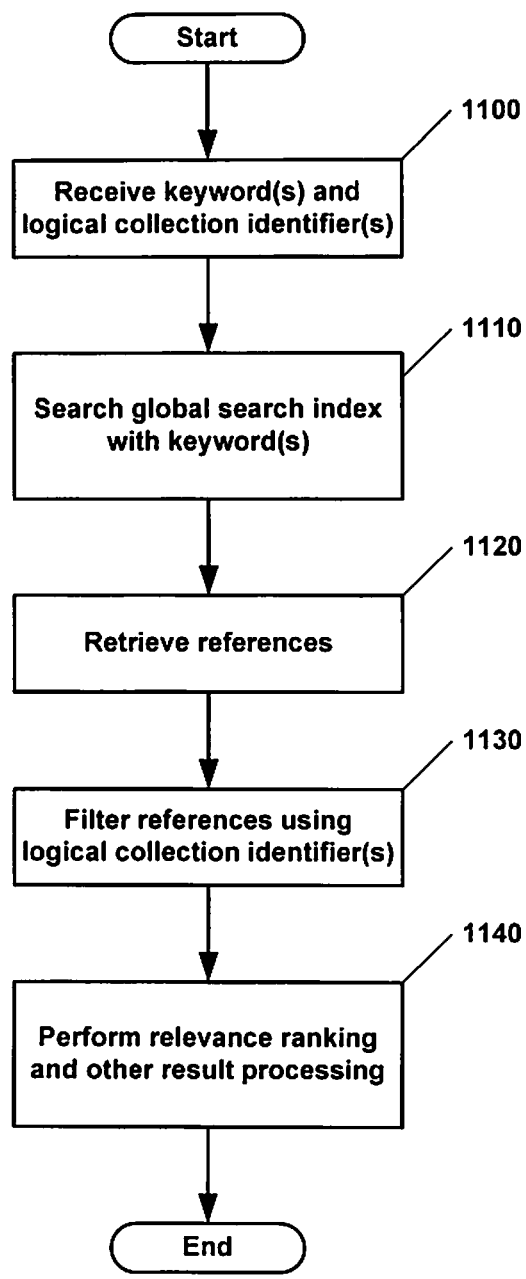
FIG. 11 is a flow diagram illustrating the operations performed in processing a search request using a logical collection according to an embodiment of the present invention.

FIG. 11 is a flow diagram illustrating a process of searching according to embodiments of the present invention that employ a global search index. In the example depicted, a system of the present invention receives keyword(s) and one or more logical collection identifiers at the desired search engine via the search engine's API (step 1100). The search engine then searches the given global search index using the keyword(s) provided (step 1110). References are then retrieved by the search engine from the global search index using the keyword(s) (step 1120). The references thus retrieved are then filtered using the logical collection identifier(s) (step 1130). The logical collection identifier(s) identify the data source(s) (and so, business objects) to be searched, and so the filtering process narrows the results produced to those from the business objects in the given logical collection. By identifying multiple data sources (business objects), the use of a logical collection identifier significantly increases the speed and efficiency with which multiple data sources (business objects) can be searched. Thus, by filtering the references using the logical collection identifier(s), a search engine of the present invention is able to perform search processing more efficiently and reduce the amount of result data (e.g., references) needing to be sent to the search server. Once the references have been retrieved and filtered, the search engine can then perform other result processing such as relevance ranking and the like (1140). Advantageously, such searching requires the user to run only a single search to perform the desired searching.

Figure 12:
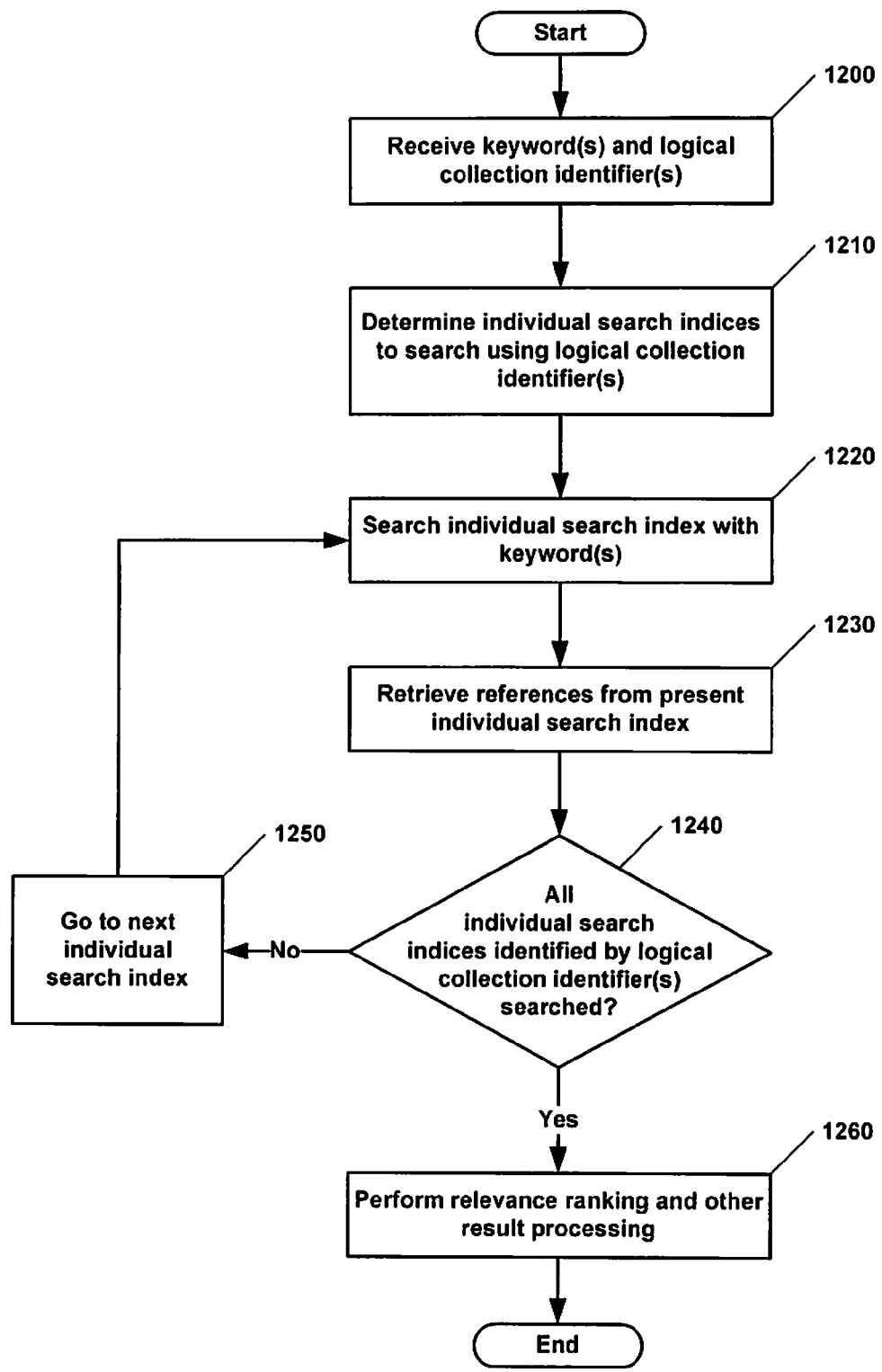
FIG. 12 is a flow diagram illustrating the operations performed in processing a search request using a logical collection according to an embodiment of the present invention.

FIG. 12 is a flow diagram illustrating searching performed according to the present invention using individual search indices. A process according to embodiments of the present invention employing individual search indices begins with the receipt of keyword(s) and logical collection identifier(s) (step 1200). A determination is then made using the logical collection identifier(s) provided as part of the search request, with regard to which individual search indices to search (step 1210). One of the individual search indices identified by the logical collection identifier(s) is then searched using the keyword(s) also provided as part of the search request (step 1220). Using the given keyword(s), references are retrieved from the present individual search index (step 1230). A determination is then made as to whether all of the individual search indices identified by the logical collection identifier(s) have been searched (step 1240). If individual search indices identified by the logical collection identifier(s) remain to be searched, the search engine moves on to the next individual search index (step 1250) and begins searching that individual search index, also using the keyword(s) supplied with the search request (step 1220). If, by contrast, all the individual search indices identified by the logical collection identifier(s) have been searched (step 1240), the search engine performs result processing, such as relevance ranking and other such result processing (step 1260). Again, advantageously, such searching requires the user to run only a single search to perform the desired searching.

An Example Computing and Network Environment

Figure 13:
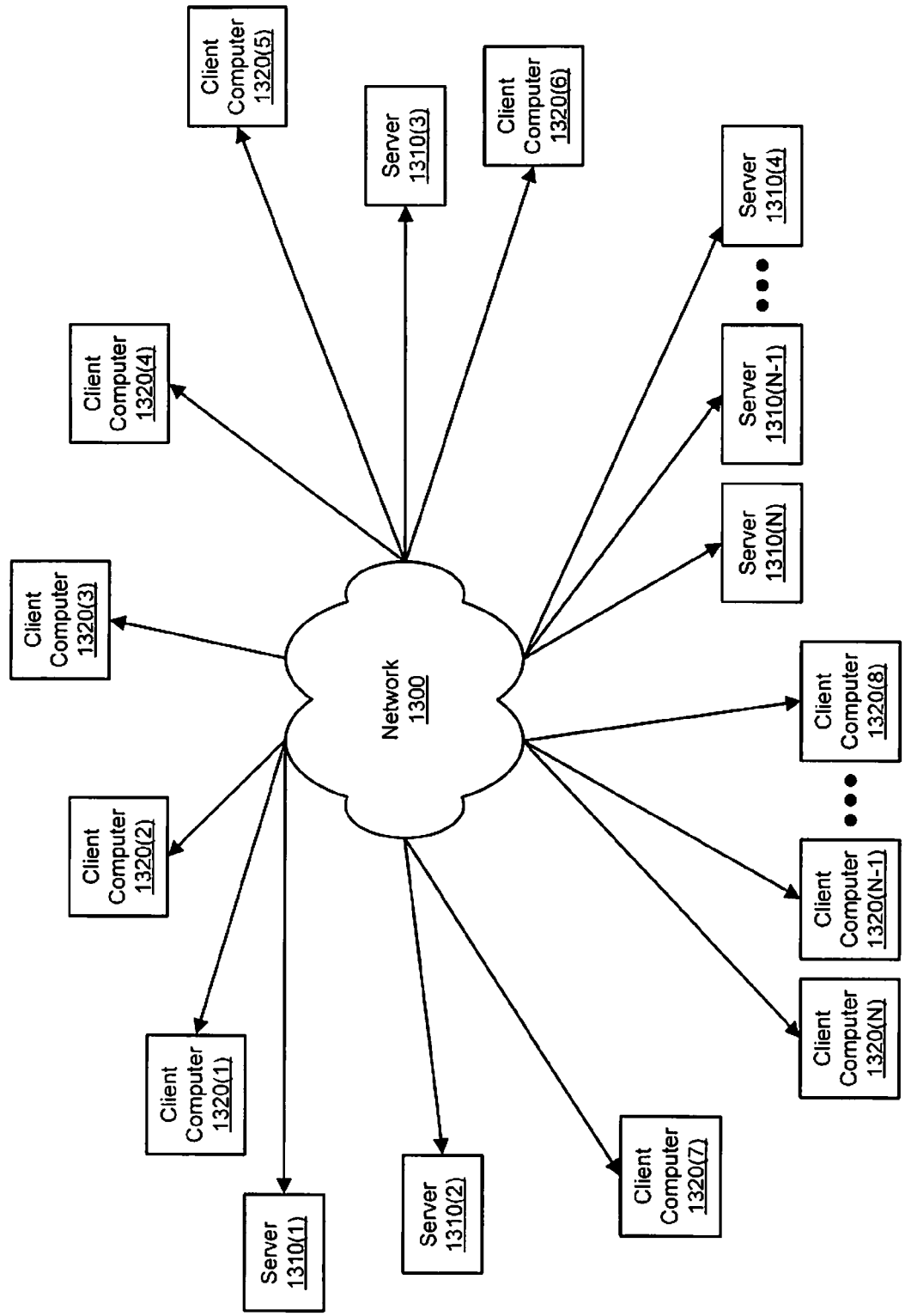
FIG. 13 is a block diagram illustrating a network environment in which commercial transaction processing according to embodiments of the present invention may be practiced.

FIG. 13 is a block diagram illustrating a network environment in which a system according to the present invention may be practiced. As is illustrated in FIG. 13, network 1300, such as a private wide area network (WAN) or the Internet, includes a number of networked servers 1310(1)-(N) that are accessible by client computers 1320(1)-(N). Communication between client computers 1320(1)-(N) and servers 1310(1)-(N) typically occurs over a publicly accessible network, such as a public switched telephone network (PSTN), a DSL connection, a cable modem connection or large bandwidth trunks (e.g., communications channels providing T1 or OC3 service). Client computers 1320(1)-(N) access servers 1310(1)-(N) through, for example, a service provider. This might be, for example, an Internet Service Provider (ISP). Access is typically had by executing application specific software (e.g., network connection software and a browser) on the given one of client computers 1320(1)-(N).

One or more of client computers 1320(1)-(N) and/or one or more of servers 1310(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 1320(1)-(N) is shown in detail in FIG. 14.

Figure 14:
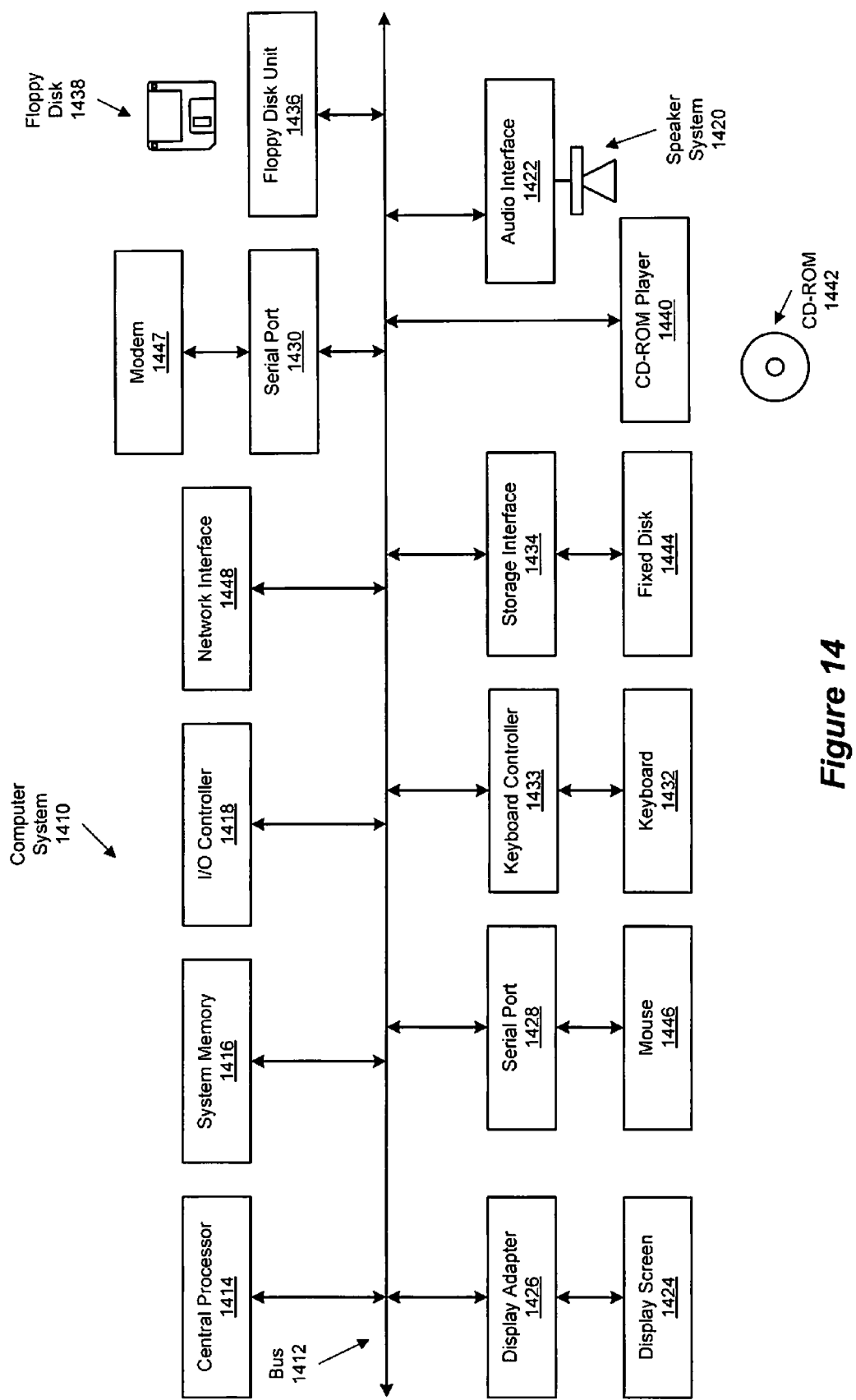
FIG. 14 is a block diagram illustrating a computer system suitable for implementing embodiments of the present invention.

FIG. 14 depicts a block diagram of a computer system 1410 suitable for implementing the present invention, and example of one or more of client computers 1320(1)-(N). Computer system 1410 includes a bus 1412 which interconnects major subsystems of computer system 1410 such as a central processor 1414, a system memory 1416 (typically RAM, but which may also include ROM, flash RAM, or the like), an input/output controller 1418, an external audio device such as a speaker system 1420 via an audio output interface 1422, an external device such as a display screen 1424 via display adapter 1426, serial ports 1428 and 1430, a keyboard 1432 (interfaced with a keyboard controller 1433), a storage interface 1434, a floppy disk drive 1436 operative to receive a floppy disk 1438, and a CD-ROM drive 1440 operative to receive a CD-ROM 1442. Also included are a mouse 1446 (or other point-and-click device, coupled to bus 1412 via serial port 1428), a modem 1447 (coupled to bus 1412 via serial port 1430) and a network interface 1448 (coupled directly to bus 1412).

Bus 1412 allows data communication between central processor 1414 and system memory 1416, which may include both read only memory (ROM) or flash memory (neither shown), and random access memory (RAM) (not shown), as previously noted. The RAM is generally the main memory into which the operating system and application programs are loaded. The ROM or flash memory may contain, among other code, the Basic Input-Output system (BIOS) which controls basic hardware operation such as the interaction with peripheral components. Applications resident with computer system 1410 are generally stored on and accessed via a computer-readable storage medium, such as a hard disk drive (e.g., fixed disk 1444), an optical drive (e.g., CD-ROM drive 1440), floppy disk unit 1436 or other such storage medium.

Storage interface 1434, as with the other storage interfaces of computer system 1410, may connect to a standard computer-readable storage medium for storage and/or retrieval of information, such as a fixed disk drive 1444. Fixed disk drive 1444 may be a part of computer system 1410 or may be separate and accessed through other interface systems. Many other devices can be connected such as a mouse 1446 connected to bus 1412 via serial port 1428, a modem 1447 connected to bus 1412 via serial port 1430 and a network interface 1448 connected directly to bus 1412. Modem 1447 may provide a direct connection to a remote server via a telephone link or to the Internet via an internet service provider (ISP). Network interface 1448 may provide a direct connection to a remote server via a direct network link to the Internet via a POP (point of presence). Network interface 1448 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 14 to be present to practice the present invention. The devices and subsystems may be interconnected in different ways from that shown in FIG. 14. The operation of a computer system such as that shown in FIG. 14 is readily known in the art and is not discussed in detail in this application. Code to implement the present invention may be stored in computer-readable storage media such as one or more of system memory 1416, fixed disk 1444, CD-ROM 1442, or floppy disk 1438. Additionally, computer system 1410 may be any kind of computing device, and so includes personal data assistants (PDAs), network appliance, X-window terminal or other such computing device. The operating system provided on computer system 1410 may be MS-DOS®, MS-WINDOWS®, OS/2®, UNIX®, Linux® or other known operating system. Computer system 1410 also supports a number of Internet access tools, including, for example, an HTTP-compliant web browser having a JavaScript interpreter, such as Netscape Navigator®, Microsoft Explorer® and the like.

Figure 15:
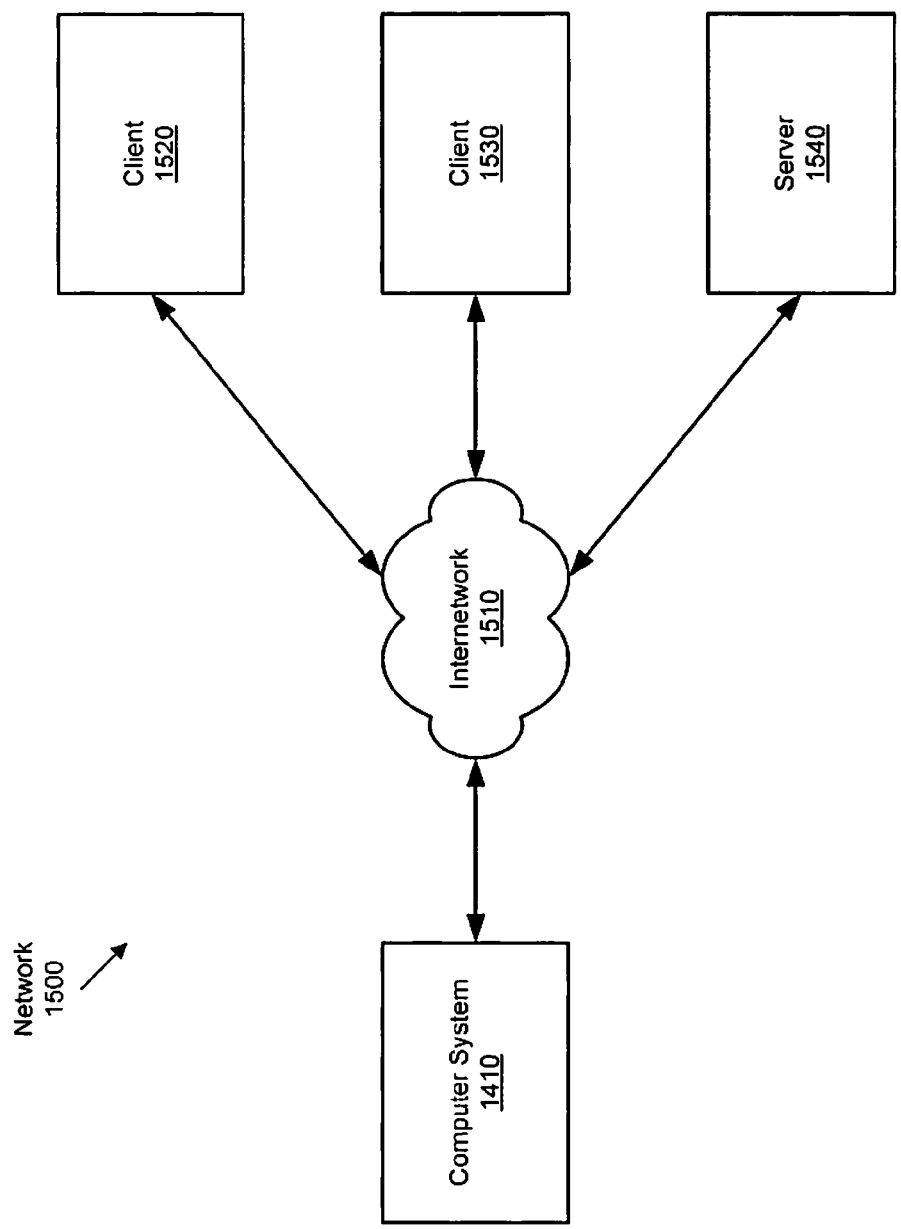
FIG. 15 is a block diagram illustrating the interconnection of the computer system of FIG. 14 to client and host systems.

FIG. 15 is a block diagram depicting a network 1500 in which computer system 1410 is coupled to an internetwork 1510, which is coupled, in turn, to client systems 1520 and 1530, as well as a server 1540. Internetwork 1510 (e.g., the Internet) is also capable of coupling client systems 1520 and 1530, and server 1540 to one another. With reference to computer system 1410, modem 1447, network interface 1448 or some other method can be used to provide connectivity from computer system 1410 to internetwork 1510. Computer system 1410, client system 1520 and client system 1530 are able to access information on server 1540 using, for example, a web browser (not shown). Such a web browser allows computer system 1410, as well as client systems 1520 and 1530, to access data on server 1540 representing the pages of a website hosted on server 1540. Protocols for exchanging data via the Internet are well known to those skilled in the art. Although FIG. 15 depicts the use of the Internet for exchanging data, the present invention is not limited to the Internet or any particular network-based environment.

Referring to FIGS. 13, 14 and 15, a browser running on computer system 1410 employs a TCP/IP connection to pass a request to server 1540, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

As noted, the foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The above description is intended to be illustrative of the invention and should not be taken to be limiting. Other embodiments within the scope of the claimed invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the claimed invention. Consequently, the invention is intended to be limited only by the scope of the appended claims, giving full cognizance to equivalents in all respects.

What is claimed is:

1. A search server comprising:
one or more processors; and
a search engine adapter, wherein
said search engine adapter is configured to be executed on said one or more processors,
said search engine adapter comprises
a generic search adapter, and
an engine specific adapter,
said generic search adapter and said engine specific adapter are communicatively coupled to one another,
said generic search adapter is configured to send a search request to said engine specific adapter,
said generic search adapter is further configured to be communicatively coupled to a plurality of engine specific adapter configured to communicate with a plurality of search engines,
said plurality of engine specific adapters comprises said engine specific adapter,
said engine specific adapter is configured to communicate with at least one respective search engine of said plurality of search engines by virtue of said engine specific adapter being configured to send at least one application programming interface (API) command to said at least one respective search engine, and
said at least one API command is configured to cause said at least one respective search engine to perform a search according to said search request by referencing a search index comprising a mapping between
one or more fields of said search index, and
one or more fields of a business object corresponding to a data source.

2. The search server of claim 1, wherein said search server further comprises:
a search services module, wherein
said search services module and said search engine adapter are communicatively coupled to one another, and
said search services module is configured to communicate with a user interface.

3. The search server of claim 2, wherein said search server further comprises:
a plurality of search engine adapters, wherein
each of said search engine adapters is communicatively coupled to said search services module.
4. The search server of claim 3, further comprising:
a virtual business component, wherein
said search engine adapter and said virtual business component are communicatively coupled to one another, and
said search services module and said virtual business component are communicatively coupled to one another.
5. The search server of claim 1, wherein
said search engine adapter further comprises
said plurality of engine specific adapters, and
said plurality of engine specific adapters comprise
said engine specific adapter.
6. The search server of claim 5, wherein
said search server is communicatively coupled to said search engines.
7. The search server of claim 6, wherein
said each engine specific adapter and said at least one respective search engine are communicatively coupled to one another.
8. The search server of claim 6, wherein
at least one of said each engine specific adapter is coupled to a plurality of said search engines.
9. The search server of claim 5, wherein
said search engine adapter is configured to be communicatively coupled to a virtual business component.
10. The search server of claim 9, wherein
said virtual business component comprises
a plurality of business objects, and
said each engine specific adapter corresponds to at least one of said business objects by virtue of said at least one respective search engine and said at least one of said business objects corresponding to one another.
11. The search server of claim 10, wherein
each of said business objects represents at least one of a plurality of data sources.
12. The search server of claim 9, wherein
said each engine specific adapter is configured to send a data access to said virtual business component, and
in response to receiving said data access from said each engine specific adapter, said virtual business component is configured to send data to said each engine specific adapter.
13. The search server of claim 5, wherein
said each engine specific adapter is configured to communicate with said at least one respective search engine by virtue of being configured to send index data to said at least one respective search engine, and
receive native result data from said at least one respective search engine, wherein
said search index comprises a plurality of references to a plurality of business objects corresponding to a plurality of data sources, and
said native result data comprises at least one reference to a business object corresponding to a data source comprising data.
14. The method of claim 1, wherein
said search request is in a generic format, and
said at least one API command is in a native format of said at least one respective search engine.
15. The method of claim 1, wherein
said data source comprises a database.

16. A method comprising:
sending index data to at least one respective search engine of a plurality of search engines, wherein
said index data is sent from an engine specific adapter of a search engine adapter,
said search engine adapter comprises
a generic search adapter, and
said engine specific adapter,
said generic search adapter is configured to be communicatively coupled to a plurality of engine specific adapters and send a search request to said engine specific adapter,
said plurality of engine specific adapters comprise said engine specific adapter,
said engine specific adapter is configured to communicate with
said generic search adapter, and
said at least one respective search engine
by virtue of being configured to send at least one application programming interface (API) command to said at least one respective search engine, and
said at least one API command is configured to cause said at least one respective search engine to perform a search according to said search request by referencing a search index comprising
one or more fields of said search index, and
one or more fields of a business object corresponding to a data source.
17. The method of claim 16, further comprising:
receiving native result data from said at least one respective search engine at said engine specific adapter, wherein
said search index comprises
a plurality of references to a plurality of business objects, wherein
each of said plurality of references corresponds to at least one corresponding data source of a plurality of data sources, and
said native result data comprises
at least one reference to a business object of the plurality of business objects, and
said business object corresponds to a data source comprising a database.
18. The method of claim 16, further comprising:
sending a data access from said engine specific adapter to a business object of a virtual business component; and
receiving data from said business object at said engine specific adapter.
19. The method of claim 18, wherein
said engine specific adapter corresponds to said business object by virtue of said at least one respective search engine and said business object corresponding to one another.
20. The method of claim 19, wherein
each of said business objects represents at least one of a plurality of data sources.
21. The method of claim 16, further comprising:
receiving a search request at a search services module;
generating a search query corresponding to said search request;
sending said search query from said search services module to said search engine adapter;
generating said index data from said search query;
generating result data from said native result data;
sending said result data from said search engine adapter to said search services module;

generating search results corresponding to said result data; and sending said search results from search services module to a user interface.

22. A computer program product comprising:
a plurality of instructions, comprising
- a first set of instructions, executable on a computer system, configured to send index data to at least one respective search engine of a plurality of search engines, wherein
- said first set of instructions are implemented in an engine specific adapter of a search engine adapter,
- said search engine adapter comprises
  - a generic search adapter, and
  - said engine specific adapter,
- said generic search adapter is configured to
  - communicate with a plurality of engine specific adapters, and
  - communicate a search request to said plurality of engine specific adapters,
- said plurality of engine specific adapters comprise said engine specific adapter,
- said engine specific adapter is configured to communicate with
  - said generic search adapter, and
  - said at least one respective search engine by virtue of being configured to communicate at least one application programming interface (API) command to said at least one respective search engine, and
- said at least one API command is configured to cause
  - said at least one respective search engine to perform a search according to said search request by referencing a search index comprising
    - one or more fields of said search index, and
    - one or more fields of a business object corresponding to a data source; and
- non-transitory computer-readable storage media, wherein
  - said instructions are encoded in said non-transitory computer readable storage media.

* * * * *